(12) United States Patent
Nakamura et al.

(10) Patent No.: US 12,546,468 B2
(45) Date of Patent: Feb. 10, 2026

(54) CONSTRUCTION

(71) Applicant: NITTO DENKO CORPORATION, Osaka (JP)

(72) Inventors: Kozo Nakamura, Osaka (JP); Yufeng Weng, Osaka (JP); Taishi Ogawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/017,248

(22) PCT Filed: Jul. 16, 2021

(86) PCT No.: PCT/JP2021/026872
§ 371 (c)(1),
(2) Date: Jan. 20, 2023

(87) PCT Pub. No.: WO2022/024823
PCT Pub. Date: Feb. 3, 2022

(65) Prior Publication Data
US 2023/0296242 A1    Sep. 21, 2023

(30) Foreign Application Priority Data
Jul. 28, 2020  (JP) ................................ 2020-127350

(51) Int. Cl.
*F21V 33/00* (2006.01)
*A01G 9/24* (2006.01)
*E04B 2/56* (2006.01)

(52) U.S. Cl.
CPC ............ *F21V 33/006* (2013.01); *A01G 9/249* (2019.05); *E04B 2/56* (2013.01); *F21V 2200/20* (2015.01)

(58) Field of Classification Search
CPC ... F21V 33/006; F21V 2200/20; A01G 9/249; A01G 9/20; E04B 2/56; E04B 2/88;
(Continued)

(56) References Cited

U.S. PATENT DOCUMENTS 8,917,447 B2 * 12/2014 Wolk .................. G02B 6/0065
                                                            359/452
9,188,733 B2 * 11/2015 Hofman .............. G02B 6/0095
(Continued)

FOREIGN PATENT DOCUMENTS

CN           101126860 A      2/2008
CN           202074366 U     12/2011
(Continued)

OTHER PUBLICATIONS

Written Opinion issued in International Bureau of WIPO Patent Application No. PCT/JP2021/026872, dated Sep. 7, 2021, along with an English translation thereof.
(Continued)

*Primary Examiner* — Tsion Tumebo
(74) *Attorney, Agent, or Firm* — Greenblum & Bernstein, P.L.C.

(57) ABSTRACT

A construction according to the invention is a construction including a framework formed by first framework members and second framework members, and panels held by the framework. One or more of the panels can transmit visible light. One or more of the panels that can transmit visible light is a lighting device. The lighting device includes a light source, and a light guide that can transmit visible light and includes a light guide plate to guide light emitted from the light source. The light guide plate includes a light incident surface facing the light source and into which the light emitted from the light source enters, a first principal surface on the interior of the construction and from which the light
(Continued)

guided in the light guide plate exits, and a second principal surface on the exterior of the construction and opposing the first principal surface.

9 Claims, 24 Drawing Sheets

(58) Field of Classification Search
CPC ....... E04C 2/54; G02B 6/0073; G02B 6/0085; G02B 6/0036; G02B 6/0041; G02B 6/0095; F21S 4/28; F21S 2/00; F21Y 2115/10; Y02A 40/25
See application file for complete search history.

(56) References Cited

U.S. PATENT DOCUMENTS

| | | | |
|---|---|---|---|
| 9,599,297 B2* | 3/2017 | Stephens | H05B 45/20 |
| 2005/0201087 A1* | 9/2005 | Ward | G02B 6/0085 |
| | | | 362/223 |
| 2009/0147504 A1* | 6/2009 | Teeters | F21V 33/006 |
| | | | 362/153 |
| 2011/0170184 A1 | 7/2011 | Wolk | |
| 2011/0244187 A1 | 10/2011 | Rinko | |
| 2013/0021819 A1* | 1/2013 | Wang | G02B 6/24 |
| | | | 362/607 |
| 2013/0100700 A1 | 4/2013 | Kubo | |
| 2014/0355125 A1 | 12/2014 | Boyd et al. | |
| 2014/0362602 A1 | 12/2014 | Hofman | |
| 2017/0254517 A1* | 9/2017 | Nijkamp | E04C 2/52 |
| 2020/0166694 A1 | 5/2020 | Sugino et al. | |
| 2020/0348462 A1 | 11/2020 | Hattori et al. | |
| 2021/0109274 A1* | 4/2021 | Rinko | G02B 6/0035 |

FOREIGN PATENT DOCUMENTS

| | | |
|---|---|---|
| CN | 103025515 A | 4/2013 |
| EP | 1106915 A1 | 6/2001 |
| JP | 2007-185115 A | 7/2007 |
| JP | 2013-195811 A | 9/2013 |
| JP | 2015-505074 A | 2/2015 |
| JP | 2018206564 A | 12/2018 |
| JP | 2019-75352 A | 5/2019 |
| JP | 2019-160608 A | 9/2019 |
| JP | 2019-194663 A | 11/2019 |
| KR | 20130112524 A | 10/2013 |
| KR | 10-2014-0018161 A | 2/2014 |
| KR | 2016-0069773 A | 6/2016 |
| WO | WO2011/124765 A1 | 10/2011 |
| WO | WO2011/127187 A1 | 10/2011 |
| WO | WO2019/087118 A1 | 5/2019 |
| WO | WO2019/146628 A1 | 8/2019 |
| WO | WO2019/182091 A1 | 9/2019 |
| WO | WO2019/224705 A1 | 11/2019 |

OTHER PUBLICATIONS

Search Report issued in International Bureau of WIPO Patent Application No. PCT/JP2021/026872, dated Sep. 7, 2021, along with an English translation thereof.
Extended European Search Report in counterpart European Patent Application No. 21849943.2 dated Jul. 12, 2024.
Japanese Office Action in counterpart Japanese Application No. JP2022-540191, dated Nov. 5, 2024 (along with English translation).
Taiwanese Office Action in counterpart Taiwanese Application No. TW110126955, dated Dec. 25, 2024 (along with English translation).
Chinese Office Action in counterpart CN Application No. 202180059556.6, dated Jun. 28, 2025 (and translation thereof).
Office Action in counterpart Chinese patent application No. 202180059556.6, dated Nov. 15, 2025, and English translation thereof.

\* cited by examiner

CONSTRUCTION

TECHNICAL FIELD

The present disclosure relates to constructions.

BACKGROUND ART

In order to make the appearance of a construction more attractive, attempts to incorporate lighting members such as LED lights into construction materials such as panel units, partition walls, and fittings are being widely made.

For example, a construction with a lighting device, which includes a lens for controlling light from a light source in a specific direction and is provided on a curtain wall forming an exterior wall, has been disclosed (for example, see Patent Document 1).

RELATED-ART DOCUMENTS

Patent Documents

Patent Document 1: Japanese Patent Application Publication No. 2019-160608

SUMMARY OF THE INVENTION

Problem to be Solved by the Invention

However, in the construction with the lighting device according to Patent Document 1, the light from the lighting device is emitted in a specific direction toward, for example, an exterior wall or the interior of the construction to stage various kinds of illumination. Hence, only the use of the lighting device for staging purposes has been disclosed in Patent Document 1, and the use of the lighting device as a light for lighting an entire indoor space has not been disclosed.

Therefore, when a lighting device is applied to a construction, it is desirable not to compromise the exterior design of the construction while allowing the interior of the construction to be visible from the outside and the outside to be visible from the interior of the construction without being obstructed by the lighting device during bright hours such as daytime and while also allowing the lighting device to function as a light for lighting the interior of the construction during dark hours such as nighttime.

One aspect of the present disclosure is to provide a construction that is able to maintain a high level of design while allowing good visibility from the inside to the outside as well as from the outside to the inside of the construction and while also allowing a lighting device to function as a light for lighting the inside of the construction.

Means to Solve the Problem

One aspect of a construction according to the present disclosure is a construction including a framework formed by a plurality of first framework members provided at predetermined intervals and a plurality of second framework members configured to couple the first framework members that are next to each other, and a plurality of transparent panels held by the framework. One or more of the transparent panels are lighting devices. The lighting devices each include a light source and a light guide plate configured to guide light emitted from the light source. The light guide plate includes a light incident surface facing the light source and into which the light emitted from the light source enters, a first principal surface provided on an interior of the construction and from which the light guided in the light guide plate exits, and a second principal surface provided on an exterior of the construction and opposing the first principal surface.

Effects of the Invention

According to one aspect of the construction of the present disclosure, the construction is able to maintain a high level of design while allowing good visibility from inside the construction to the outside and from the outside to inside the construction and while also allowing a lighting device to function as a light for lighting the interior of the construction.

MODE FOR CARRYING OUT THE INVENTION

Figure 1:
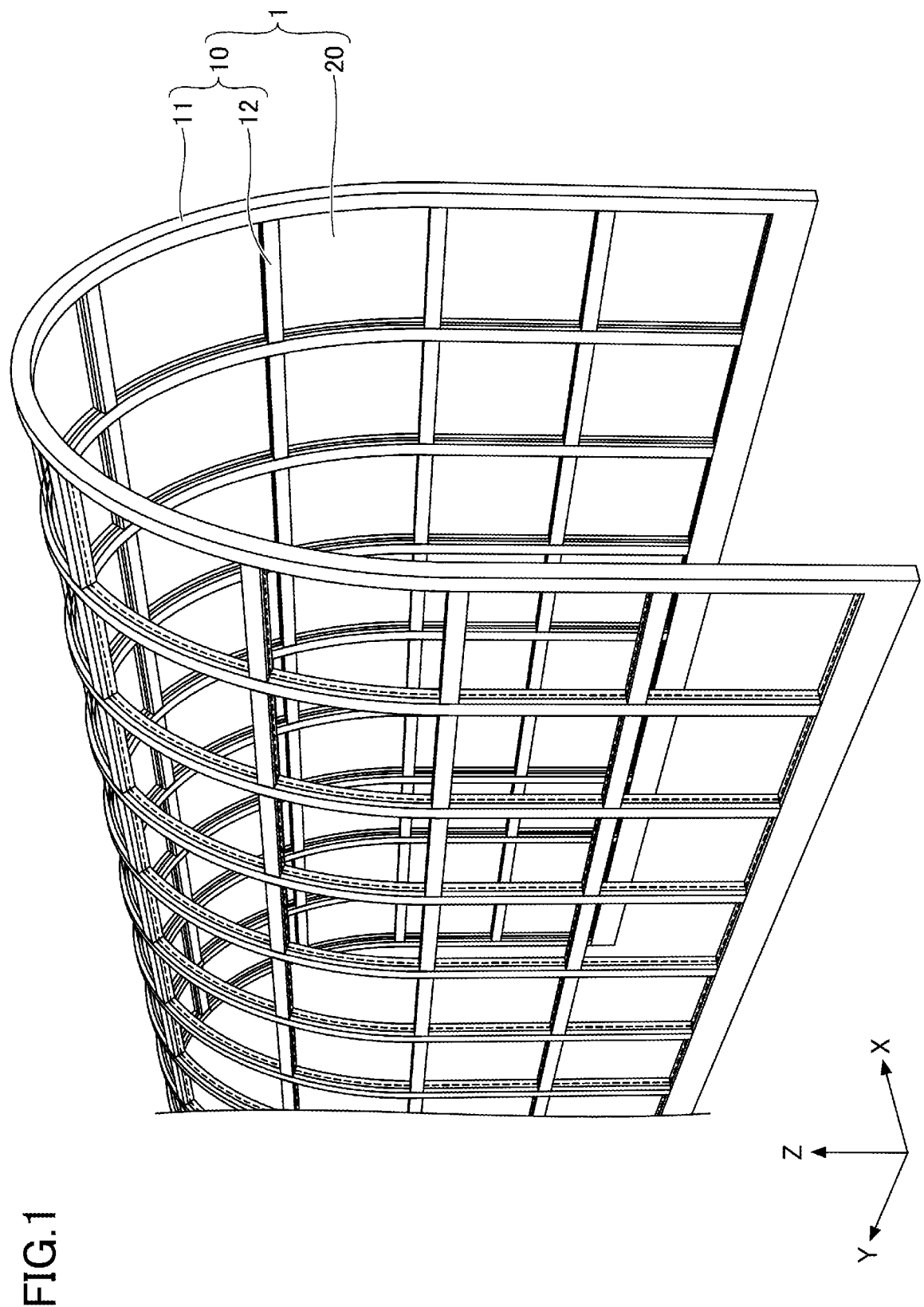
FIG. 1 is a perspective view illustrating a construction according to the first embodiment of the present disclosure.

The embodiments of the present disclosure will be described in detail below. In order to facilitate the understanding of the description, the same reference symbols are used to denote the same components throughout the drawings, and a repetitive description thereof is omitted. Note also that the respective scales of the components in the drawings may differ from those in practice. In this specification, a tilde "~" that is used to indicate a numerical range includes the numerical value written immediately before the wave dash and the numerical value written immediately after the tilde as the lower limit value and the upper limit value, respectively, of the numerical range, unless otherwise specified.

First Embodiment

A construction according to the first embodiment of the disclosure will be described. FIG. 1 is a perspective view illustrating the construction according to the embodiment. As illustrated in FIG. 1, a construction 1 according to the embodiment includes a framework 10 and a plurality of panels 20 held by the framework 10.

In this specification, a three-dimensional coordinate system including triaxial directions (the X-axis direction, the Y-axis direction, and the Z-axis direction) is used. Assume that the width direction of the construction is the X-axis direction, the length direction of the construction is the Y-axis direction, and the height direction of the construction is the Z-axis direction. Assume that the +Z-axis direction indicates the direction from the bottom to the top of the construction, and the −Z-axis direction indicates the converse thereof. In the following description, the +Z-axis direction is referred to as up or upward, and the −Z-axis direction is referred to as down or downward.

<Framework>

The framework 10 is formed by a plurality of first framework members 11 and a plurality of second framework members 12.

Figure 2:
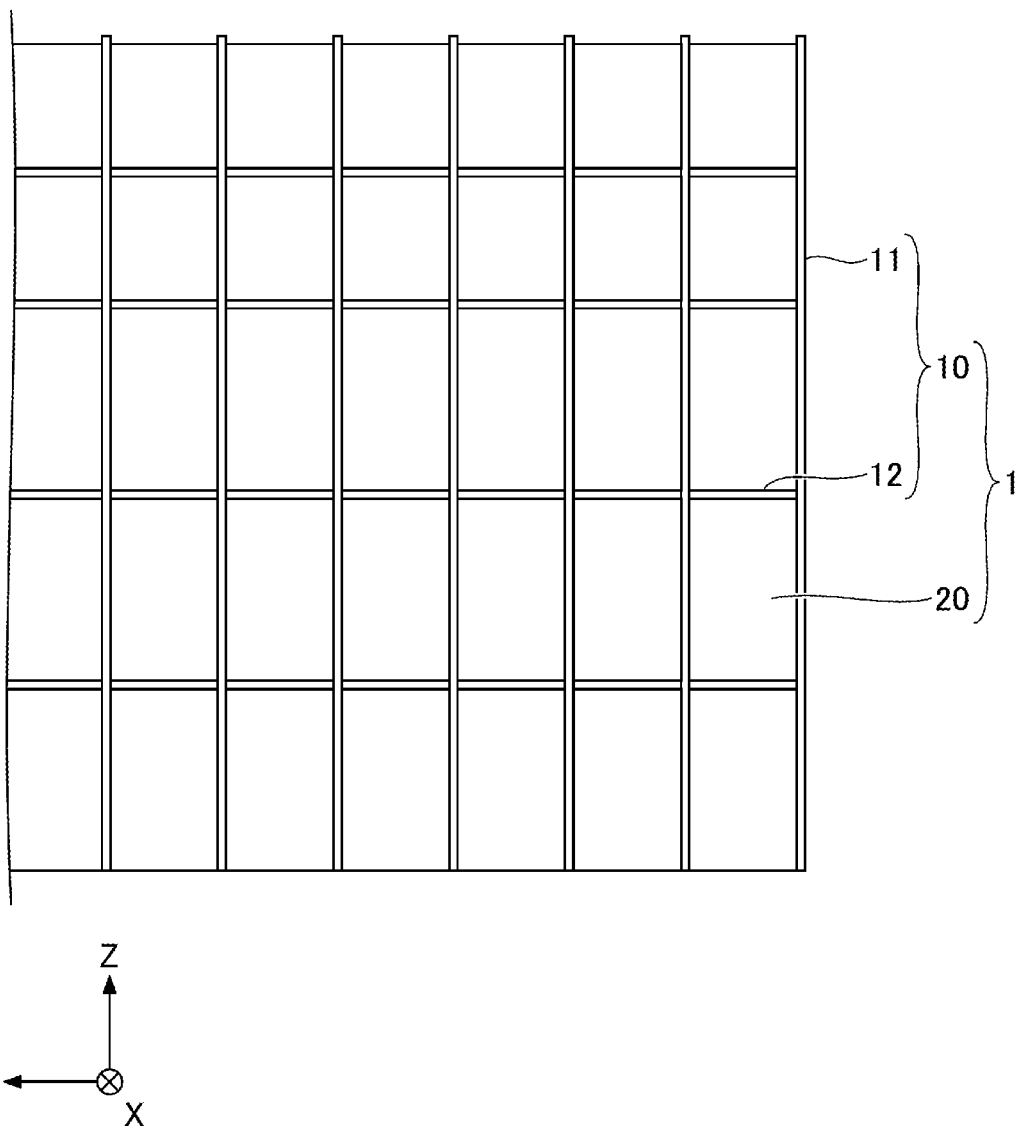
FIG. 2 is a partial side view of the construction of FIG. 1 as seen from the X-axis direction.

FIG. 2 is a partial side view of the construction of FIG. 1 as seen from the X-axis direction. As illustrated in FIG. 2, the plurality of first framework members 11 are provided at predetermined intervals in the Y-axis direction. Each first framework member 11 is formed in an H-shape when viewed in its long axis direction. The first framework members 11 are configured to be of a size that allows the panels 20 to be inserted in gaps formed between their inner surfaces. By combining the plurality of first framework members 11 along their long axis, the framework 10 can be formed into an arch shape when viewed in the lengthwise direction (the Y-axis direction) of the construction as illustrated in FIG. 1. Note that the framework 10 may be formed into another shape such as a polygon (including a rectangle) when viewed in the lengthwise direction (the Y-axis direction) by appropriately designing the shape of the first framework members 11.

As illustrated in FIG. 2, the second framework members 12 are provided at predetermined intervals in the Z-axis direction, and couple the first framework members 11 that are next to each other. In a similar manner to the first framework members 11, each second framework member 12 is formed in an H-shape when viewed in its long axis direction. In a similar manner to the first framework members 11, the second framework members 12 are configured to be of a size that allows the panels 20 to be inserted in gaps formed between their inner surfaces.

The framework 10 can hold the panels 20 by inserting each panel 20 in a gap formed between the inner surfaces of corresponding first framework members 11 such that each panel 20 is interposed and fitted in a gap between the inner surfaces of corresponding second framework members 12. Note that the framework 10 may hold the panels 20 by inserting each panel 20 in a gap formed between the inner surfaces of corresponding second framework members 12 such that each panel 20 is interposed and fitted in a gap between the inner surfaces of corresponding first framework members 11. The framework 10 may hold the panels 20 by interposing and fitting each panel 20 in the gap between the inner surfaces of corresponding first framework members 11 and in the gap between the inner surfaces of corresponding second framework members 12.

Metal such as aluminum or stainless steel can be used as the material of the first framework members 11 and the second framework members 12.

<Panel>

Each of the plurality of panels 20 is held by the framework 10 by being fitted to the framework 10. Among the plurality of panels 20, one or more of the panels 20 are capable of transmitting visible light (light transmission capability). One or more of the panels 20 that are capable of transmitting visible light are formed by a lighting device 30A. Note that each panel 20 that is capable of transmitting visible light may include a component other than the lighting device 30A. Furthermore, among the plurality of panels 20, all of the panels 20 that are capable of transmitting visible light may be formed by the lighting device 30A or some of the panels 20 may be formed by the lighting device 30A.

Note that being capable of transmitting light represents having a transmission capability that allows visible light (light of a wavelength of 380 nm to 780 nm) to be transmitted in the panel 20 when the panel 20 is irradiated with the visible light from the outside of the panel 20. The transmittance of visible light of the panels 20 is preferably 60% or more, is more preferably 75% or more, and is even more preferably 90% or more. The transmittance of visible light can be specified as the average value of transmittances acquired by measuring the visible light at wavelengths of 380 nm to 780 nm by a spectrophotometer.

The material of the panel 20 is not particularly limited in a case where the lighting device 30A is not employed as the panel 20 that is capable of transmitting visible light. However, it is possible to use the same materials as those used for, for example, a light guide plate 33 (to be described later).

(Lighting Device)

The lighting device 30A will be described. In this embodiment, a case in which the vertically installed plate-like panel 20 is formed by the lighting device 30A will be described as an example for the sake of descriptive convenience.

Figure 3:
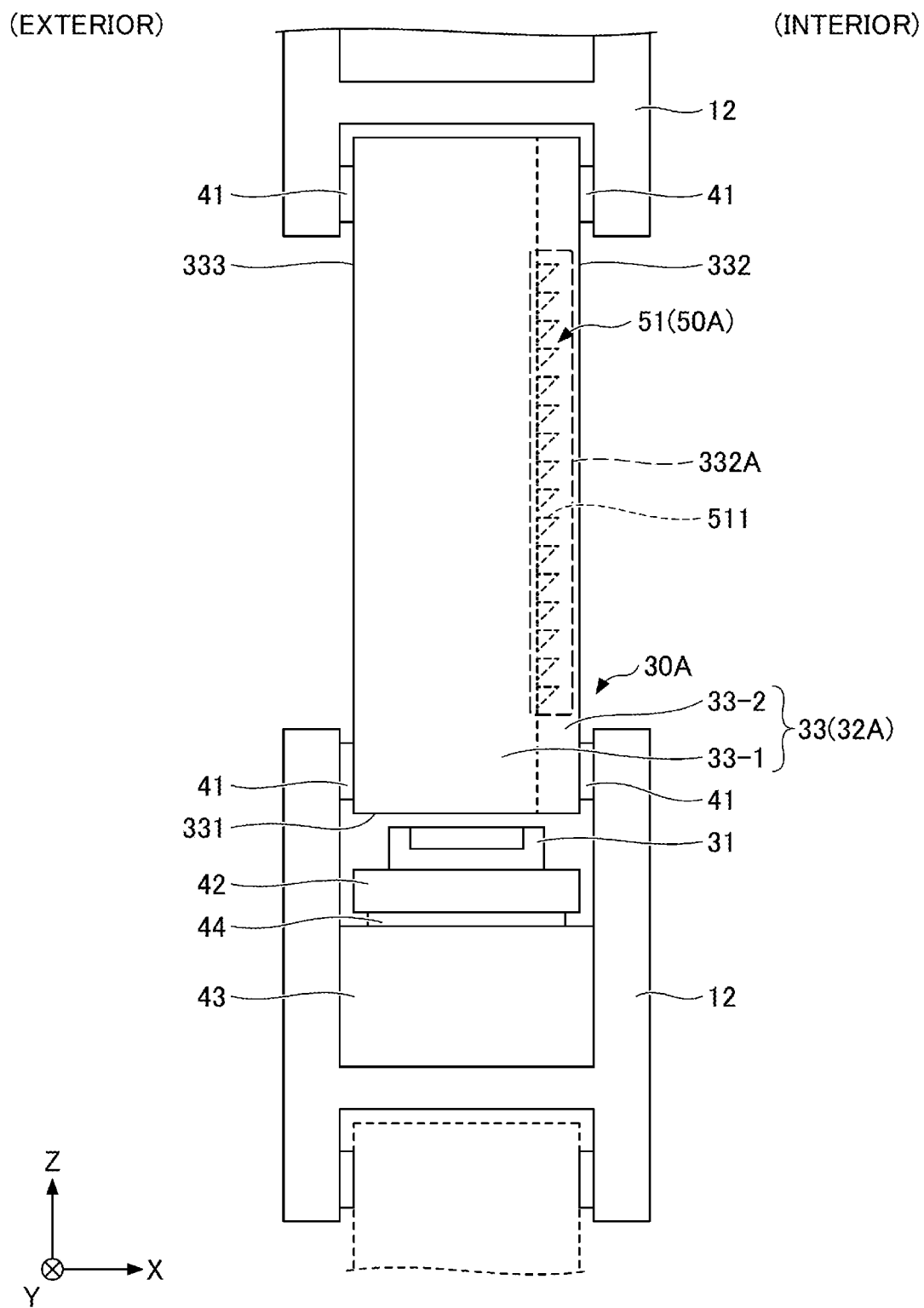
FIG. 3 is a view of a state in which a transparent panel is fitted to a framework as seen from the Y-axis direction.

FIG. 3 is a view of a state in which the panel 20 is fitted to the framework 10 as seen from the Y-axis direction. As illustrated in FIG. 3, the lighting device 30A includes light sources 31 and a light guide 32A. The light guide 32A is configured in a plate shape. Both the upper and lower ends of the light guide 32A are held by a pair of holding members 41 provided on the inner surfaces of the corresponding first framework members 11. The light guide 32A is provided so as to have a predetermined space from the light sources 31 that are positioned below the light guide 32A. In the lighting device 30A, the light that is guided through the light guide 32A and exits from the light guide 32A is emitted to the interior of the construction.

The light sources 31 are arranged in the gap between the inner surfaces of the second framework members 12. Note that the light sources 31 may be arranged on the gap between the inner surfaces of the first framework members 11 or may be arranged on both the inner surfaces of the second framework members 12 and the inner surfaces of the first framework members 11.

The light sources 31 are installed on a substrate 42 provided inside of the second framework member 12. A conductive metal material such as aluminum can be used for the substrate 42. The substrate 42 is fixed onto a heat dissipator 43 by a double-sided adhesive tape 44, and the heat generated from the light sources 31 is dissipated by the heat dissipator 43. The heat dissipator 43 can be formed by a heat dissipating layer that releases heat to the outside. A material with high thermal conductivity, for example, carbon, copper, or aluminum, can be used for the heat dissipator 43. Since the substrate 42 only needs to be fixed onto the heat dissipator 43, an adhesive agent may be used instead of the double-sided adhesive tape 44.

A known light source such as a light emitting diode (LED), a linear light source such as a fluorescent lamp or a cold cathode tube, or a plurality of optical fibers bundled into a line can be used as the light sources 31.

Figure 4:
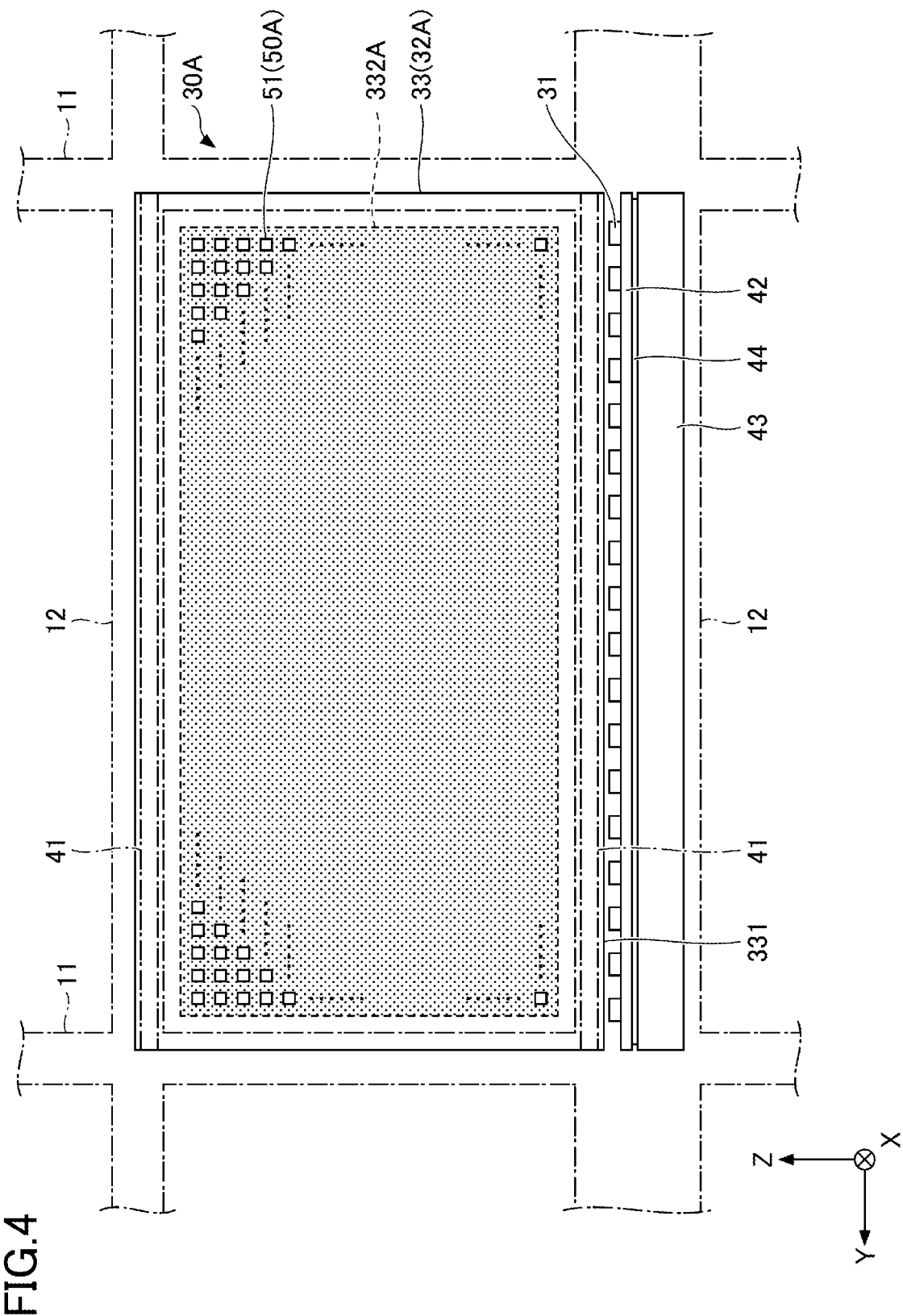
FIG. 4 is a view of the transparent panel as seen from the X-axis direction.

FIG. 4 is a view of the panel 20 as seen from the X-axis direction. As illustrated in FIG. 4, the plurality of light sources 31 are arrayed linearly on the substrate 42, which is provided inside of the second framework member 12, along the Y-axis direction. Each light source 31 emits light in response to the application of a driving voltage from a driving circuit (not illustrated). As a result, linear rays of light extending in the Y-axis direction and formed by the respective rays of light emitted from light sources 31 can be emitted in the +Z-axis direction. Monochromatic light or white light such as warm white, natural white, and cool white can be used as the light emitted by the light source 31 to serve as illumination.

The light guide 32A is capable of transmitting visible light and has a function of guiding the light emitted from the light sources 31. The light guide 32A includes a light guide plate 33 configured to guide the light emitted from the light sources 31.

The light guide plate 33 is formed in a rectangular shape. Note that the light guide plate 33 can be formed to include a curved principal surface in accordance with the shape of the framework 10.

Figure 5:
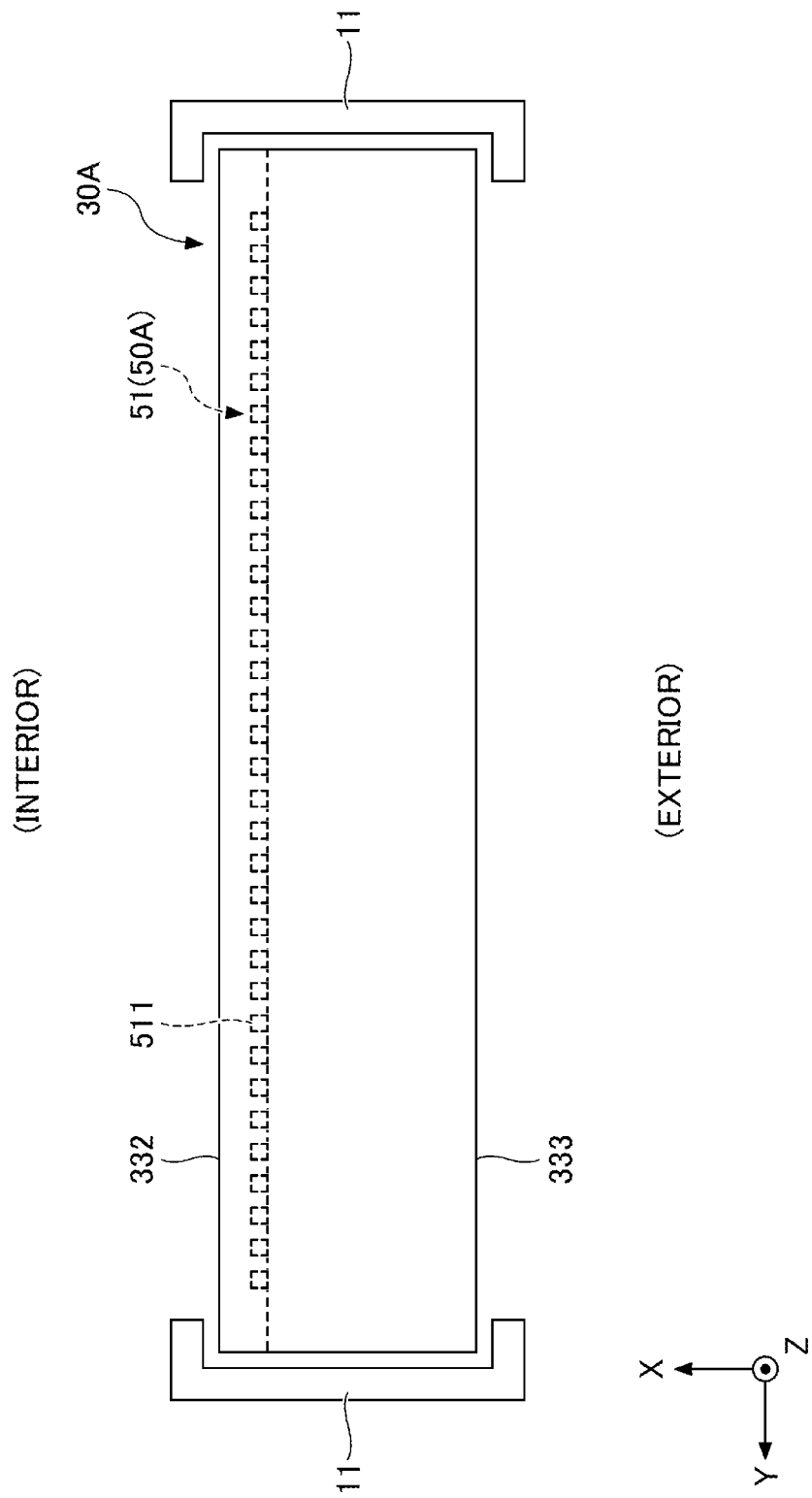
FIG. 5 is a view of a state in which the transparent panel is fitted to the framework as seen from the Z-axis direction in a state without second framework members.

As illustrated in FIG. 4, the light guide plate 33 can be sandwiched near the ends of its upper and lower surfaces by the second framework members 12 through the holding members 41. FIG. 5 is a view of a state in which a transparent panel is fitted into the framework 10 as seen from the Z-axis direction in a state without the second framework members 12. As illustrated in FIG. 5, the light guide plate 33 is held such that its side surface sections (the end surface sections in the Y-axis directions) are disposed in the gap formed between the inner surfaces of the first framework members 11 of the framework 10. Hence, by employing the pair of holding members 41 provided on the inner surfaces of the second framework members 12 of the framework 10 to engage with the upper and lower ends of the light guide plate 33, the light guide plate 33 can be supported within the framework 10 while maintaining a predetermined position and posture with respect to the light sources 31.

The light guide plate 33 is capable of transmitting light.

The light guide plate 33 can be manufactured by molding a material capable of transmitting light. The material includes, for example, olefin resins such as polyethylene (PE), polypropylene (PP), cycloolefin polymers (COP), and cycloolefin copolymers (COC); acrylic resins such as polymethylmethacrylate (PMMA); styrenic resins such as polystyrene (PS), acrylonitrile styrene resin, and acrylonitrile butadiene styrene (ABS) resin; vinyl-based resins such as polyvinyl chloride (PVC) resin, vinylidene chloride resin, polyacrylonitrile, polyvinyl acetate, acrylic acid copolymers, and polyvinyl alcohol; fluorinated resins such as polytetrafluoroethylene (PTFE), polychlorotrifluoroethylene (PCTFE), polyvinyl fluoride resin, and polyvinylidene fluoride; engineering plastics such as polycarbonate (PC) resin, polyacetal (POM) resin, polyethylene terephthalate (PET), polybutylene terephthalate (PBT), polycyclohexylene dimethyl terephthalate, polyphenylene oxide, nylon 6, nylon 66, and aromatic polyamide; super engineering plastics such as polyphenylene sulfide (PPS) resin, polysulfone (PSF) resin, polyether sulfone (PES), polyether ether ketone (PEEK), polyarylate resin, aromatic polyester resin, polyimide (PI) resin, polyamideimide (PAI) resin, polyetherimide (PEI) resin, and aramid resin; thermosetting resins such as epoxy resins, silicone resins, phenolic resins, unsaturated polyester resins, and polyurethane resins; and glass. One of the above materials may be used alone or two or more of the above materials may be used in combination. Among these materials, PMMA can be used favorably.

Since the refractive index, the intensity, and the moisture resistance of the light guide plate 33 will change depending on the type of material, it is preferable to select the material appropriately in accordance with, for example, the use conditions and the use environment of the construction 1. Note that the light guide plate 33 may be made of a colored material as long as it is capable of transmitting visible light.

The light guide plate 33 can be molded into a desired shape using known molding methods such as compression molding, injection molding, and extrusion molding (transfer molding). A mold corresponding to the shape of the light guide plate 33 can be used when these molding methods are employed. Alternatively, the light guide plate 33 may be formed by, for example, using a forming press or laser machining.

As illustrated in FIG. 3, the light guide plate 33 includes a light incident surface 331 to which the rays of light emitted from the light sources 31 enter, a first principal surface 332 provided on the interior of the construction 1 and from which the rays of light guided in the light guide plate 33 exit, and a second principal surface 333 provided on the exterior of the construction 1 and opposing the first principal surface 332. Note that the first principal surface 332 is the principal surface positioned on the interior side of the construction 1, and the second principal surface 333 is the principal surface positioned on the exterior side of the construction 1.

The light guide plate 33 includes, inside of the light guide plate 33, a light extractor 50A configured to allow the rays of light guided in the light guide plate 33 to exit from the first principal surface 332. The light extractor 50A is provided closer to the first principal surface 332 in the light guide plate 33.

The light extractor 50A can be formed by a gap portion 51. The gap portion 51 can include a plurality of gaps (to be also referred to as cavities) 511. The plurality of gaps 511 can totally reflect the rays of light propagated through the light guide plate 33 and allow the reflected rays of light to exit from the first principal surface 332. Assume that a first light-emitting portion 332A is an area within the first principal surface 332 and is an area that is passed by the rays of light made to exit from the light guide plate 33 by the light extractor 50A.

The plurality of gaps 511 may be provided regularly or randomly in the light guide plate 33 along at least one of the width direction (Y-axis direction) or the height direction (Z-axis direction) of the light guide plate 33.

Each gap 511 is filled with air. Note that, instead of air, each gap 511 may be filled with a material that has a lower refractive index than the light guide plate 33.

The size of the gaps 511 can be designed appropriately in accordance with, for example, the range in which the gaps 511 can be installed in the light guide plate 33. The interval between two neighboring gaps 511 can be selected appropriately within a range that allows the interval to be formed in the light guide plate 33.

It is preferable to design the angle of the interface between the light guide plate 33 and the air gaps 511 to be a suitable angle for illuminating the interior of the construction 1.

As illustrated in FIG. 4, the light guide plate 33 can be manufactured by employing a method of bonding a first light-guide plate 33-1, which has no formation of a pattern, to a second light-guide plate 33-2, which has a formation of a desired recessed micropattern, by a lamination method such as a microwave surface treatment. The light guide plate 33 can be manufactured by employing a method of adhesively bonding the first light-guide plate 33-1 to the second light-guide plate 33-2 by an adhesive agent such as a pressure-sensitive adhesive. To reduce reflection at the interface between the first light-guide plate 33-1 and the second light-guide plate 33-2, it is preferable for the refractive indices of the first light-guide plate 33-1 and the second light-guide plate 33-2 to be substantially equal. Further, in a case where the first light-guide plate 33-1 and the second light-guide plate 33-2 are to be bonded by an adhesive agent, it is preferable for the refractive index of the adhesive agent to be substantially equal to the refractive indices of the first light-guide plate 33-1 and the second light-guide plate 33-2. Note that in this embodiment, the recessed micropattern may be formed on the first light-guide plate 33-1, but may not be formed on the second light-guide plate 33-2. Alternatively, the recessed micropattern may not be formed on both the first light-guide plate 33-1 and the second light-guide plate 33-2.

Laser patterning, direct laser imaging, laser drilling, or laser or electron beam irradiation can be employed to form the micropattern on the second light-guide plate 33-2. Further, the material or refractive index values may be changed by imparting individual characteristics by, for example, inkjet printing or screen printing. Microdispensing/nanodispensing, dosing, laser sintering, micro electrical discharge machining, micromachining, micromolding, imprinting, embossing, or the like can also be employed.

In the lighting device 30A, the rays of light emitted from the light sources 31 in the +Z-axis direction enter into the light guide plate 33 through the light incident surface 331, and are guided through the light guide plate 33 in the +Z-axis direction while being repeatedly, totally reflected by the first principal surface 332 and the second principal surface 333.

Figure 6:
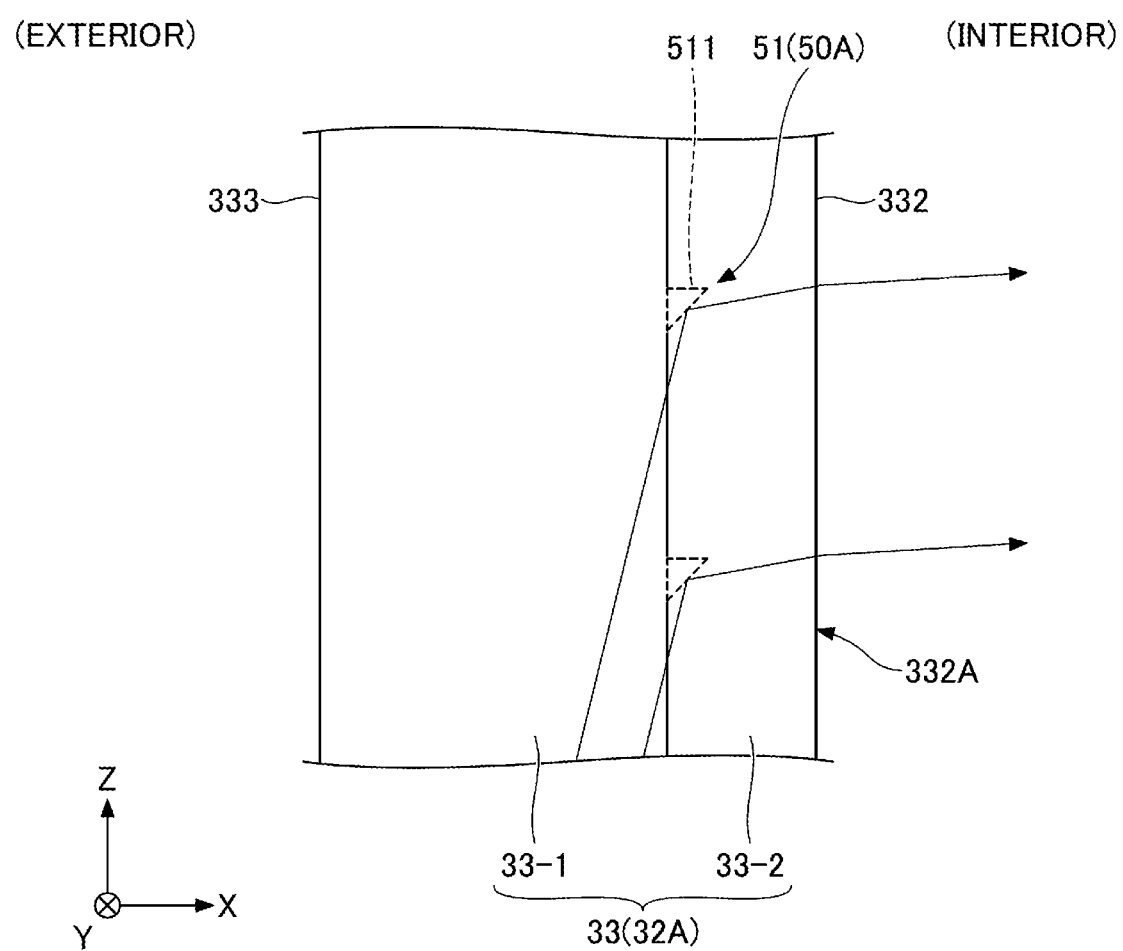
FIG. 6 is an explanatory view illustrating the paths traveled by rays of light in a light extractor.

As illustrated in FIG. 6, some of the rays of light, which are guided through the light guide plate 33 in the +Z-axis direction while being totally reflected by the first principal surface 332 and the second principal surface 333, are reflected, scattered, or diffracted by the gaps 511 of the light extractor 50A and are guided to the first principal surface 332. These rays of light exit from the light guide plate 33 through the first light-emitting portion 332A. The rays of light that exited from the first light-emitting portion 332A illuminate the interior of the construction 1.

Note that the amount of light exiting from the first principal surface 332 can be measured by, for example, the total luminous flux measurement system (Otsuka Electronics Co., Ltd.). The amount of light exiting from the first principal surface 332 can be adjusted by, for example, adjusting the amount of light from each light source 31 or the area of the first light-emitting portion 332A.

In this manner, the construction 1 according to the embodiment includes the framework 10 and the plurality of panels 20, and the lighting device 30A is used as one or more of the panels 20. The lighting device 30A includes the light sources 31 and the light guide plate 33. The light guide plate 33 includes the light incident surface 331, the first principal surface 332, and the second principal surface 333. The lighting device 30A allows the rays of light emitted from the light sources 31 to enter into the light guide plate 33 from the light incident surface 331, and allows the rays of light guided in the light guide plate 33 to exit from the first principal surface 332 of the light guide plate 33 to the interior of the construction.

Further, in the construction 1, the light guide plate 33 included in the lighting device 30A is capable of transmitting light. Hence, during bright hours such as daytime, the interior of the construction 1 is easily visible from the outside and the outside is easily visible from the interior of the construction 1 without being obstructed by the lighting device 30A. Further, in the construction 1, the lighting device 30A allows the rays of light from the light sources 31 to enter the light incident surface 331, and allows the rays of light guided through the light guide plate 33 to exit from the first principal surface 332 of the light guide plate 33. Hence, during dark hours such as nighttime, the lighting device 30A can function as a light for lighting the interior of the construction 1.

Furthermore, in the construction 1, the light sources 31 of each lighting device 30A can be provided so as not to be externally visible on at least one of the corresponding first framework members 11 or the corresponding second framework members 12 forming the framework 10. Hence, the appearance of the construction 1 can be maintained without compromising the design.

Thus, the construction 1 according to the embodiment is able to maintain a high level of design while allowing good visibility from inside the construction 1 to the outside as well as from the outside to inside the construction 1 and while allowing each lighting device 30A to function as a light for lighting the interior of the construction. Therefore, the construction 1 can provide a construction that is both practical and highly designed.

Further, in the construction 1, including the light extractor 50A in the lighting device 30A allows the rays of light guided in the light guide plate 33 to exit from the first principal surface 332. Hence, in the construction 1, good visibility from inside the construction 1 to the outside as well as from the outside to inside the construction 1 can be maintained, each lighting device 30A can effectively function as a light for lighting the interior of the construction, and the design characteristics of the construction can be maintained.

Further, in the construction 1, the gap portion 51 can be provided to serve as the light extractor 50A in the light guide plate 33, and the gap portion 51 can include the plurality of gaps 511 so that the rays of light propagated through the light guide plate 33 are totally reflected by the gaps 511 and exit from the first principal surface 332. Hence, in the construction 1, since the rays of light guided from the light sources 31 into the light guide plate 33 are able to exit into the interior of the construction, the lighting device 30A can effectively function as a light for lighting illuminating the interior of the construction.

Further, in the construction 1, the light guide plate 33 is capable of transmitting light. Configuring the light guide plate 33 to be capable of transmitting light allows a person who is inside the construction 1 to see outside the construction 1 through the light guide plate 33 and a person who is outside the construction 1 to see the inside of the construction 1 through the guide plate 33. Hence, it is possible to reliably inhibit the reduction in the visibility from the inside to the outside of the construction and in the visibility from the outside to the inside of the construction.

Since the construction 1 according to the embodiment can be practical and highly designed as described above, it can be suitably used as, for example, a roof of a construction, a roofed passage, or a greenhouse. Particularly, in a case where the construction 1 is used as a greenhouse, the walls of the greenhouse can be made transparent and configured to emit light, thereby providing an environment where plants are actively irradiated with light of colors that are effective for plants. Hence, the construction 1 can be used effectively as a greenhouse.

Figure 7:
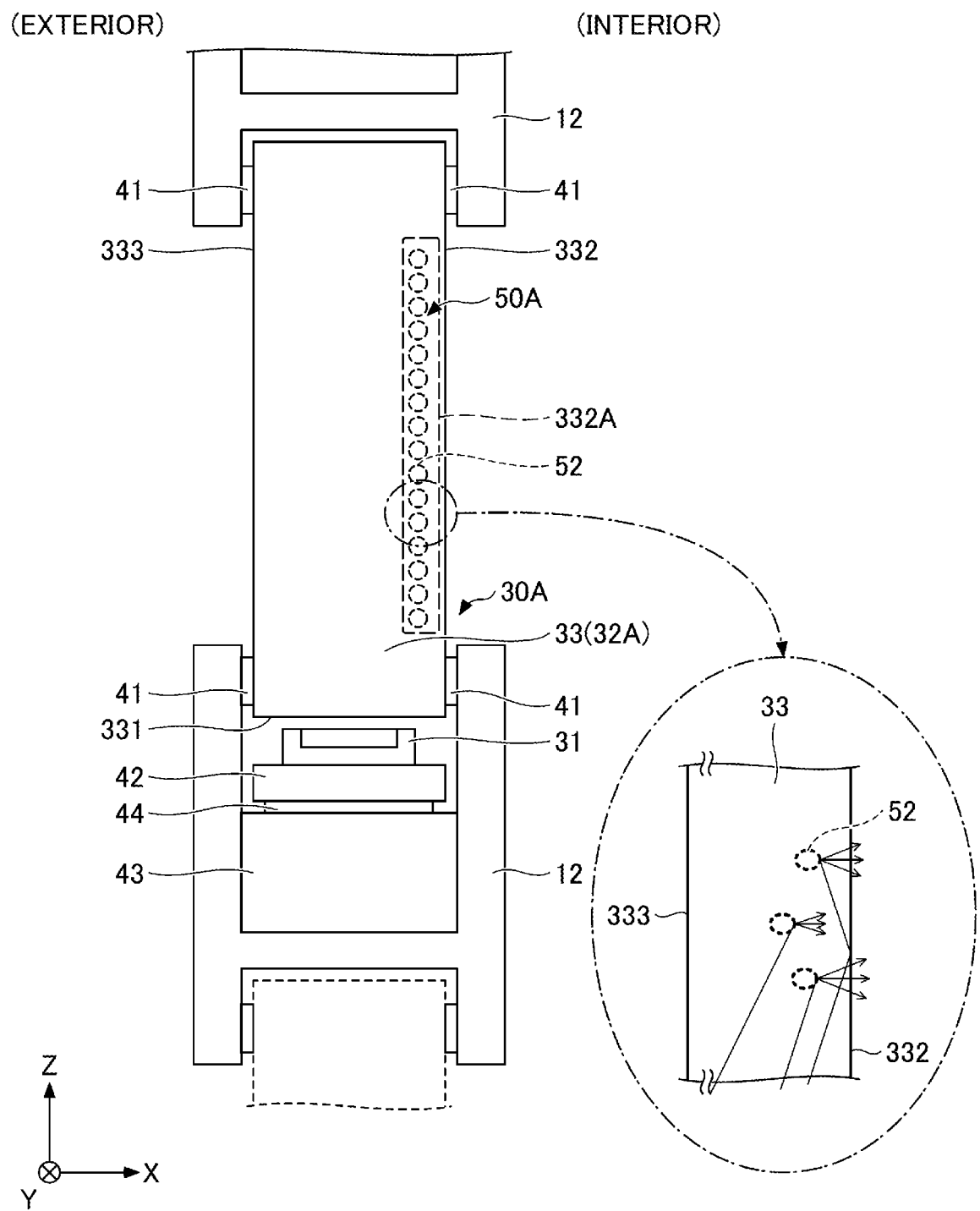
FIG. 7 is a view illustrating an example of another configuration of the light device as seen from the Y-axis direction.

Note that in this embodiment, as illustrated in FIG. 7, the light extractor 50A may include light scattering particles 52 instead of the gap portion 51 in the light guide plate 33. The light scattering particles 52 have a refractive index difference with respect to the material composing the light guide plate 33. The light scattering particles 52 are particles with an average particle size of 0.3 μm to 5 μm, and are able to function as light scattering media that scatter the rays of light guided in the light guide plate 33. The light scattering particles 52 can scatter the rays of light propagated through the light guide plate 33 and allow the rays of light to exit from the first principal surface 332. An "average particle size" refers to a "volume average particle size", and can be measured by, for example, a known particle size distribution analyzer such as a centrifugal automatic particle size distribution analyzer.

The rays of light guided through the light guide plate 33 are reflected, scattered, or diffracted by the light scattering particles 52 of the light extractor 50A and are led to the first principal surface 332. The guided rays of light exit from the light guide plate 33 through the first light-emitting portion 332A. The rays of light that exited from the first light-emitting portion 332A illuminate the interior of the construction 1.

Second Embodiment

The construction according to the second embodiment of the disclosure will be described. In the construction according to this embodiment, a first optical function layer is provided on the exterior of the first principal surface 332 of the light guide plate 33 included in the construction 1 according to the above-described first embodiment, and the light extractor 50A is provided inside of the first optical functional layer.

Figure 8:
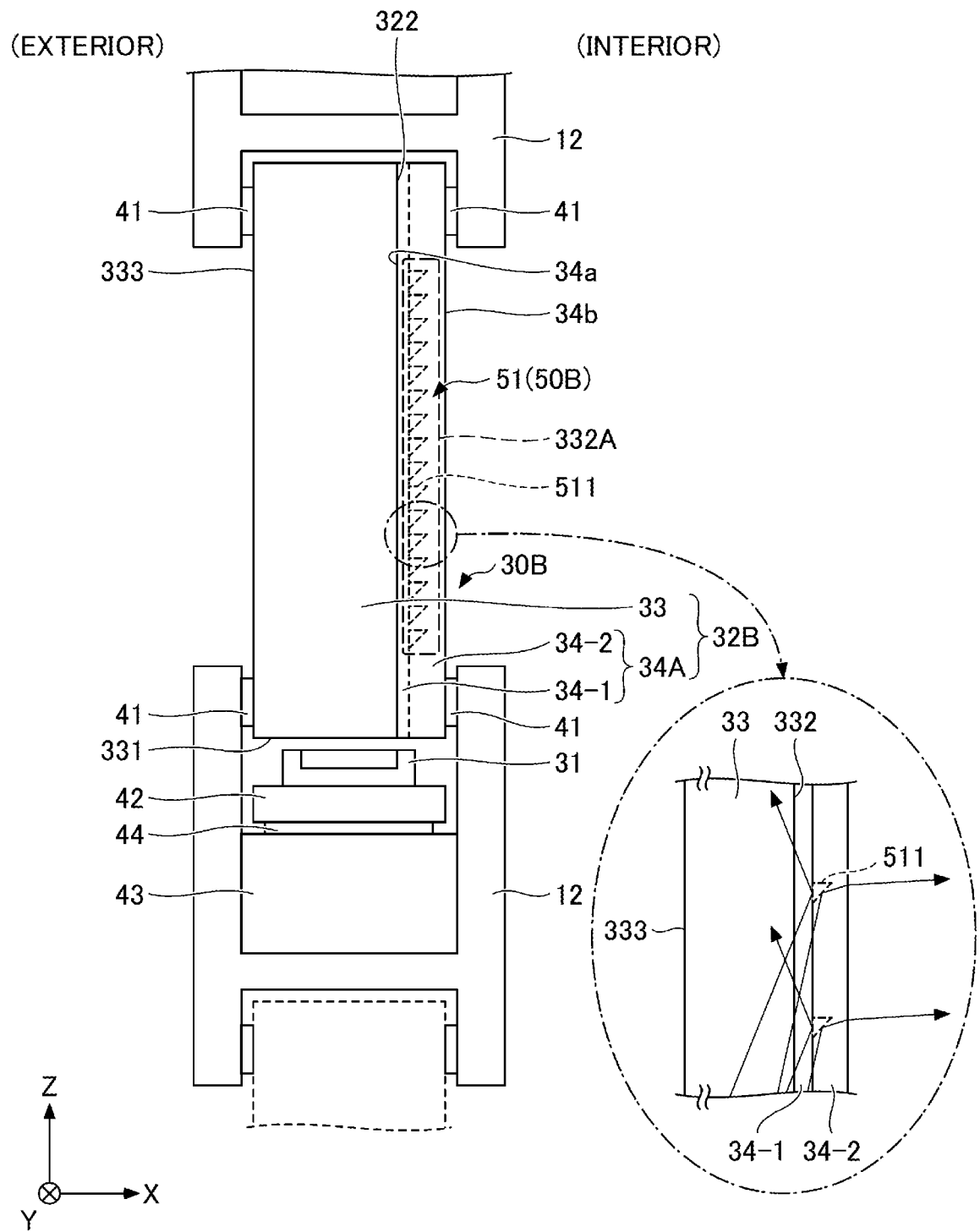
FIG. 8 is a view of a state in which the lighting device included in the construction according to the second embodiment of the present disclosure is fitted to the framework as seen from the Y-axis direction.

FIG. 8 is a side view of a state in which the lighting device included in the construction according to the embodiment is fitted to the framework as seen from the Y-axis direction. As illustrated in FIG. 8, instead of the light guide 32A of the lighting device 30A of the construction 1 according to the above-described first embodiment, a lighting device 30B included in the construction according to the embodiment includes a light guide 32B, which includes the light guide plate 33 and a first optical function layer 34A provided on the exterior of the first principal surface 332 of the light guide plate 33. Also, instead of the light extractor 50A provided in the light guide plate 33, a light extractor 50B is provided inside of the first optical function layer 34A.

The light guide 32B includes the light guide plate 33 and the first optical function layer 34A provided on the first principal surface 332 of the light guide plate 33.

The first optical function layer 34A refers to a layer configured to perform an optical function. The first optical function layer 34A is configured to allow the rays of light that entered from an entrance surface 34a, which faces the first principal surface 332, to exit from an exit surface 34b, which is on the opposite side.

The first optical function layer 34A is a layer made of material such as resin. The first optical function layer 34A can be made of the same materials as the light guide plate 33. The first optical function layer 34A can be provided on the first principal surface 332 by employing, for example, a method of bonding layered materials including the first optical function layer 34A by a lamination method such as a microwave surface treatment or by employing a method of adhesively bonding the layered materials including the first optical function layer 34A by a pressure-sensitive adhesive agent.

Note that a cover layer or a layer that has another function may be provided between the first optical function layer 34A and the light guide plate 33 or on the surface of the first optical function layer 34A on the opposite side of the light guide plate 33.

In order to restrict the diffraction and the reflection of light at the interface with the light guide plate 33, it is preferable for the material of the first optical function layer 34A and the material of the adhesive agent used to adhesively bond the first optical function layer 34A to the light guide plate 33 to have a refractive index that is close to the refractive index of the light guide plate 33.

The light extractor 50B includes the gap portion 51 composed of the plurality of gaps 511 provided in the first optical function layer 34A. In the first optical function layer 34A, the rays of light that entered through the entrance surface 34a can be made to exit from the exit surface 34b by the gap portion 51. Note that since the gap portion 51 is provided in the first optical function layer 34A, the area where the gap portion 51 is provided in the first optical function layer 34A can function as the first light-emitting portion 332A configured to allow light to exit outside.

Since the gap portion 51 can be configured in a similar manner to the gap portion 51 of the light guide plate 33 of the lighting device 30A included in the construction 1 according to the above-described first embodiment, a detailed description of the gap portion 51 will be omitted. It is preferable to design the angle of the interface between the first optical function layer 34A and each gap 511 to be a suitable angle for illuminating the interior of the construction 1.

As the first optical function layer 34A included in the gap portion 51, for example, it is possible to use an optical function layer disclosed in PCT International Application Publication No. 2011/124765, PCT International Application Publication No. 2011/127187, PCT International Application Publication No. 2019/087118, or PCT International Application Publication No. 2019/182091. The contents of these disclosures are incorporated into this specification by reference.

The gap portion 51 of the first optical function layer 34A can be formed in a similar manner to the gap portion 51 of the light guide plate 33 of the construction 1 according to the above-described first embodiment. That is, the gap portion 51 can be formed inside of the first optical function layer 34A by bonding, for example, a first film 34-1, with no pattern formed thereon, to a second film 34-2, with a desired micropattern formed thereon, by a lamination method such as a microwave surface treatment. The gap portion 51 can also be formed inside of the first optical function layer 34A by employing a method of adhesively bonding the first film 34-1 to the second film 34-2 by an adhesive agent such as a pressure-sensitive adhesive.

To form a micropattern on the second film 34-2, a method similar to that employed to form the micropattern on the second film 34-2 of the light guide plate 33 of the construction 1 according to the above-described first embodiment can be used.

In the lighting device 30B, the rays of light emitted from the light sources 31 in the +Z-axis direction enter into the light guide plate 33 through the light incident surface 331, and are guided through the light guide plate 33 in the +Z-axis direction while being repeatedly, totally reflected by the first principal surface 332 and the second principal surface 333.

The rays of light guided through the light guide plate 33 enter the first optical function layer 34A by passing through or being diffracted at the interface between the light guide plate 33 and the first optical function layer 34A. Some of the rays of light guided through the first optical function layer 34A are reflected at the interface between the first optical function layer 34A and the gaps 511, and are guided toward the first light-emitting portion 332A of the first principal surface 332. Among these reflected rays of light, the rays of light that enter the first principal surface 332 at an angle that exceeds the critical angle exit outside from the first optical function layer 34A.

The rays of light that are not reflected at the interface between the first optical function layer 34A and the gaps 511 are guided in the +Z-axis direction by being repeatedly, totally reflected at the interface between the first optical function layer 34A and the external air. Some of these rays of light are reflected at the interface between the first optical function layer 34A and the gaps 511, and subsequently exit from the light guide plate 33 to the outside.

Hence, in the lighting device 30B, the light extractor 50B can be employed to allow the rays of light to exit from the first optical function layer 34A in the +X-axis direction.

In this manner, the construction according to the embodiment includes the framework 10 and the plurality of panels 20, and the lighting device 30B is used as one of more of the panels 20. In a similar manner to the lighting device 30A of the construction 1 according to the above-described first embodiment, the lighting device 30B includes the light sources 31 and the light guide plate 33, and the light guide plate 33 includes the light incident surface 331, the first principal surface 332, and the second principal surface 333. Hence, in a similar manner to the construction 1 according to the above-described first embodiment, the construction according to the embodiment is able to maintain a high level of design while allowing good visibility from inside the construction to the outside as well as from the outside to inside the construction and while also allowing each lighting device 30B to function as a light for lighting the interior of the construction.

Further, in the construction according to the embodiment, the lighting device 30B includes the light guide 32B that includes the first optical function layer 34A on the first principal surface 332 of the light guide plate 33, and the light extractor 50B is provided in the first optical function layer 34A. As a result, the rays of light guided through the light guide plate 33 are able to pass through the gaps 511 included in the first optical function layer 34A from the first principal surface 332 of the light guide plate 33, and are able to exit reliably from the first optical function layer 34A to the interior of the construction.

Furthermore, in a similar manner to the light guide plate 33, the first optical function layer 34A is capable of transmitting visible light. Thus, a person who is inside the construction can see the outside through the light guide plate 33, and a person who is outside can see inside the construction through the guide plate 33. Hence, it is possible to inhibit the reduction in the visibility from inside the construction to the outside and in the visibility from the outside to inside the construction.

Figure 9:
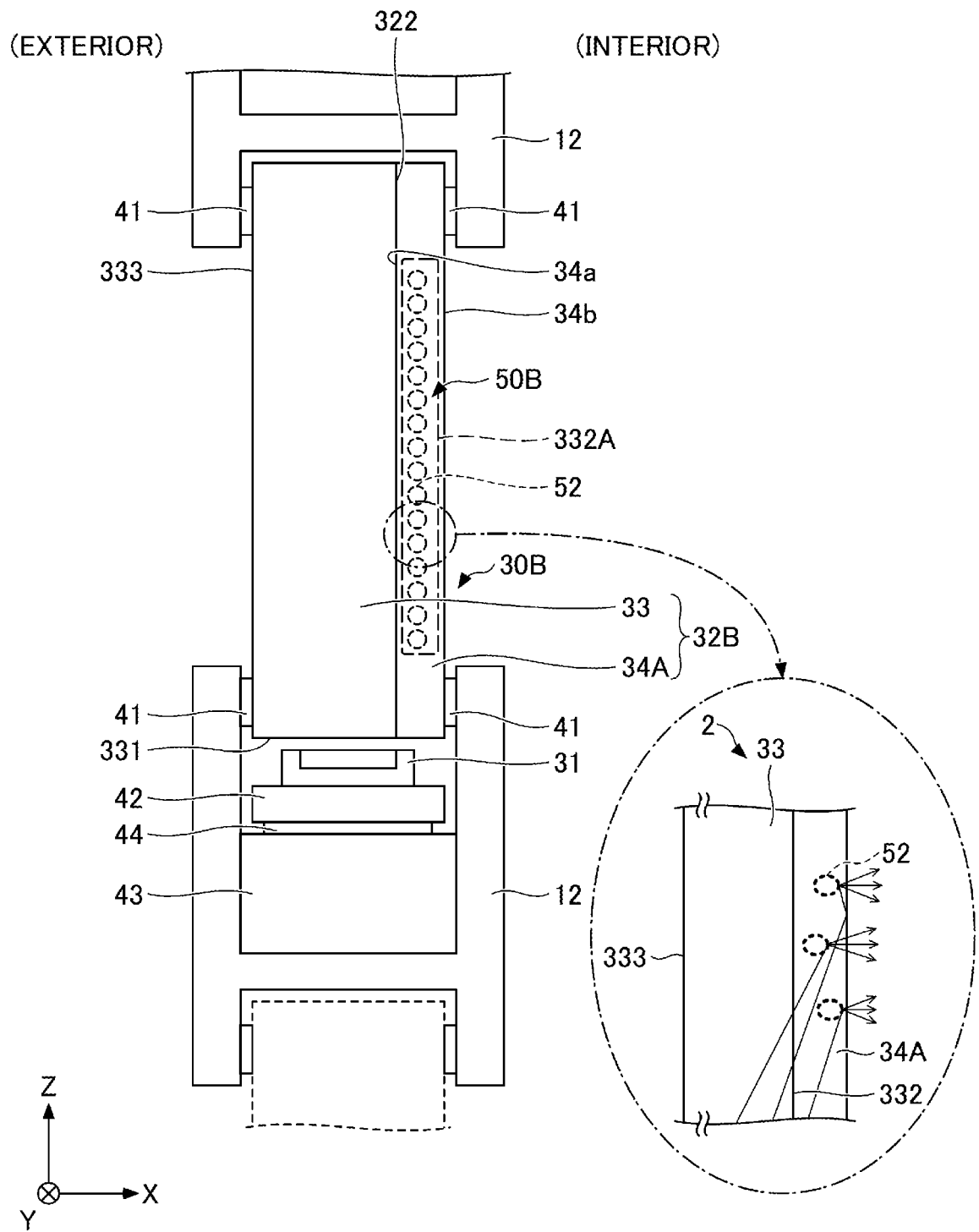
FIG. 9 is a view illustrating an example of another configuration of the lighting device as seen from the Y-axis direction.

Note that in the embodiment, as illustrated in FIG. 9, the light extractor 50B may include the light scattering particles 52 instead of the gap portion 51 in the first optical function layer 34A. The light scattering particles 52 have a refractive index difference with respect to the material composing the first optical function layer 34A. The light scattering particles 52 are particles with an average particle size of 0.3 μm to 5 μm, and are able to function as light scattering media that scatter the rays of light propagated through the first optical function layer 34A. The plurality of light scattering particles 52 can scatter the rays of light propagated through the first optical function layer 34A and allow the rays of light to exit from an exit surface positioned on the opposite side of the first principal surface 332. Although the optical function layer containing the light scattering particles is not limited to a particular optical function layer, it is possible to use, for example, an optical function layer disclosed in Japanese Patent Application Publication Laid-Open No. 2013-195811. The contents thereof are incorporated by reference in this specification.

In the lighting device 30B illustrated in FIG. 9, the rays of light guided in the light guide plate 33 enter into the first optical function layer 34A by passing through or being diffracted at the interface of the light guide plate 33 and the first optical function layer 34A. Subsequently, some of the rays of light guided in the first optical function layer 34A are scattered at the interface between the first optical function layer 34A and the light scattering particles 52, are guided toward the first principal surface 332, and exit from the first optical function layer 34A to the outside. Note that the portion where the rays of light exit in the first principal surface 332 correspond to the first light-emitting portion 332A.

The rays of light that were not scattered at the interface between the first optical function layer 34A and the light scattering particles 52 are guided in the +Z-axis direction while being repeatedly, totally reflected at the interface between the first optical function layer 34A and the external air. Some of these rays of light are scattered at the interface between the light scattering particles 52 and the first optical function layer 34A, and are able to exit from the first optical function layer 34A to the outside. Scattering of light occurs as described above in each of the plurality of light scattering particles 52 provided in the first optical function layer 34A.

In this manner, the light extractor 50B can cause the rays of light to exit in the +X-axis direction from the entire first light-emitting portion 332A provided along the plane of the first principal surface 332.

Third Embodiment

A construction according to the third embodiment of the disclosure will be described. In the construction according to the embodiment, a first optical function layer is provided on the exterior of the first principal surface 332 of the light guide plate 33 included in the construction 1 according to the above-described first embodiment, and the light extractor 50A is provided in the first optical function layer.

Figure 10:
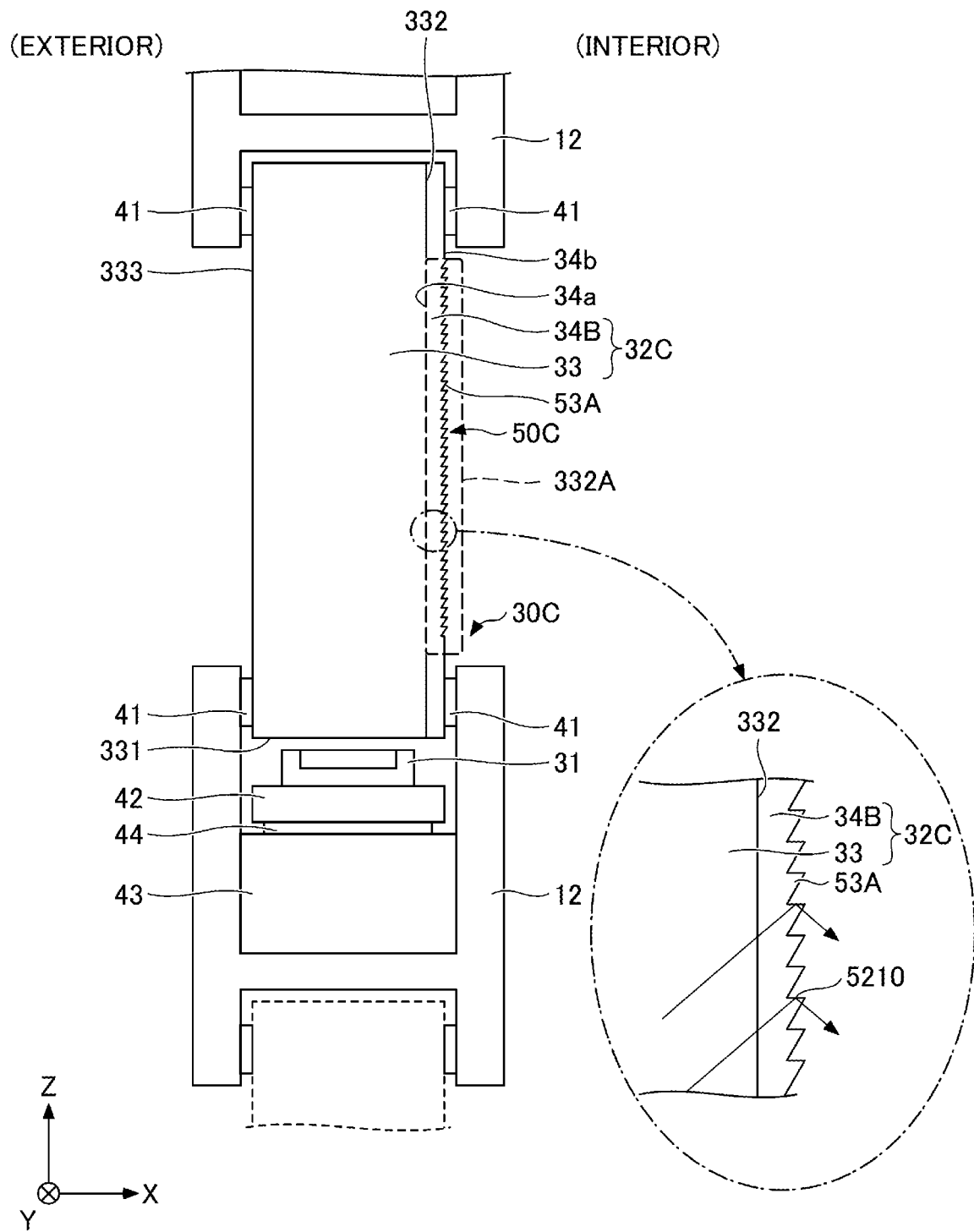
FIG. 10 is a view of a state in which the lighting device included in the construction according to the third embodiment of the present disclosure is fitted to the framework as seen from the Y-axis direction.

FIG. 10 is a side view of the lighting device included in the construction according to the embodiment as seen from the Y-axis direction. As illustrated in FIG. 10, instead of the light guide 32A in the lighting device 30A of the construction 1 according to the above-described first embodiment, a lighting device 30C included in the construction according to this embodiment includes a light guide 32C, which includes the light guide plate 33 and a first optical function layer 34B provided on the exterior of the first principal surface 332 of the light guide plate 33. In addition, instead of the light extractor 50A that is provided in the light guide plate 33, a light extractor 50C is provided on the exit surface positioned on the opposite side of the first principal surface 332 of the first optical function layer 34B.

The light guide 32C includes the light guide plate 33 and the first optical function layer 34B that is provided on the first principal surface 332 of the light guide plate 33.

In the first optical function layer 34B, prisms 53A are employed to allow the rays of light that entered from the entrance surface 34a, which faces the first principal surface 332, to exit from the exit surface 34b.

In a similar manner to the first optical function layer 34A, the first optical function layer 34B is a layer made of a material such as resin, and can be made by using a material similar to that of light guide plate 33. It is preferable for the first optical function layer 34B to be made of a material that has a refractive index that is close to the refractive index of the light guide plate 33 to restrict the diffraction and the reflection rays of light on the interface between the light guide plate 33 and the first optical function layer 34B.

The light extractor 50C includes the prisms 53A on the surface of the first optical function layer 34B.

The prisms 53A can be formed on the first optical function layer 34B by employing a method similar to the method for forming a micropattern on the second film 34-2 of the light guide plate 33 of the construction 1 according to the above-described first embodiment.

The plurality of prisms 53A can be provided regularly or randomly on the surface of the first optical function layer 34B. The size of each prism 53A and the interval between the prisms 53A that are next to each other can be selected appropriately within a range that allows them to be formed on the first optical function layer 34B.

Each prism 53A includes a fine inclined surface that can deflect light. Since the prisms 53A are provided on the surface of the first optical function layer 34B, the area where the first optical function layer 34B is provided on the first principal surface 332 can function as the first light-emitting portion 332A. Note that the prisms 53A can increase the rays of light reflected by surfaces such as surfaces 5211 that are substantially parallel to the X-axis direction and are surfaces other than the inclined surfaces. Hence, it is preferable to design the prisms 53A so that the rays of light enter surfaces such as the surfaces 5211, which are surfaces other than the inclined surfaces.

In the lighting device 30C, the rays of light emitted from the light sources 31 in the +Z-axis direction enter into the light guide plate 33 through the light incident surface 331, and are guided through the light guide plate 33 in the +Z-axis direction while being repeatedly, totally reflected by the first principal surface 332 and the second principal surface 333.

The rays of light guided in the light guide plate 33 pass through the interface or are diffracted at the interface between the light guide plate 33 and the first optical function layer 34B, and enter into the first optical function layer 34B. Subsequently, the rays of light guided through the first optical function layer 34B are scattered at the interface between the prisms 53A and the air, thus allowing the rays of light to exit outside (toward the interior of the construction) from the prisms 53A.

In this manner, the construction according to the embodiment includes the framework 10 and the plurality of panels 20, and the lighting device 30C is used as one or more of the panels 20. In a similar manner to the lighting device 30A of the construction 1 according to the above-described first embodiment, the lighting device 30C includes the light sources 31 and the light guide plate 33, and the light guide plate 33 includes the light incident surface 331, the first principal surface 332, and the second principal surface 333. Hence, in a similar manner to the construction 1 according to the above-described first embodiment, the construction according to this embodiment is able to maintain a high level of design while allowing good visibility from inside the construction 1 to the outside as well as from the outside to inside the construction and while also allowing the lighting device 30C to function as a light for lighting the interior of the construction.

Further, in the construction according to the embodiment, the lighting device 30C includes the light guide 32C that includes the first optical function layer 34B on the first principal surface 332 of the light guide plate 33. In addition, the light extractor 50C is provided on the surface of the first optical function layer 34B. As a result, the rays of light guided through the light guide plate 33 are able to pass through the first optical function layer 34B included in the light extractor 50C from the first principal surface 332 of the light guide plate 33, and are able to exit reliably from the prism 53A to the interior of the construction.

Further, in a similar manner to the light guide plate 33, the first optical function layer 34B is capable of transmitting visible light. Thus, a person inside the construction can see the outside through the light guide plate 33, and a person who is outside the construction can see inside the construction through the guide plate 33. Hence, it is possible to inhibit the reduction in the visibility from inside the construction to the outside and in the visibility from the outside to inside the construction.

Figure 11:
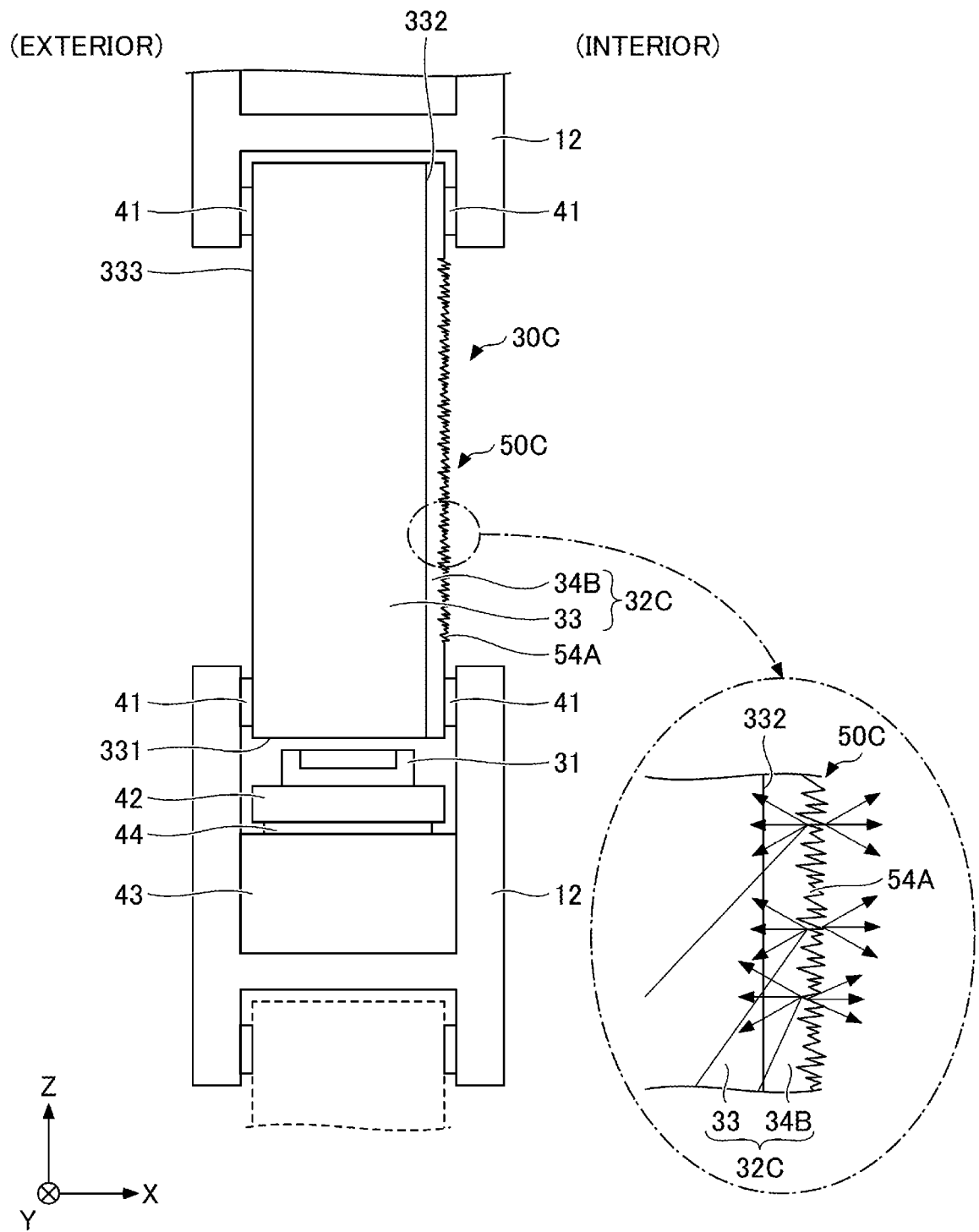
FIG. 11 is a view illustrating an example of another configuration of the lighting device as seen from the Y-axis direction.

Note that in this embodiment, the light extractor 50C may include recesses and protrusions 54A instead of the prisms 53A as illustrated in FIG. 11. The recesses and protrusions 54A include a plurality of recesses and protrusions each having a width of 1 μm to 50 μm. By being formed irregularly on the surface of the first optical function layer 34B, the recesses and protrusions 54A can scatter the rays of light guided through the first optical function layer 34B toward the interior of the construction.

The recesses and protrusions 54A can be formed on the first optical function layer 34B by employing a method similar to the method for forming a micropattern on the second film 34-2 of the light guide plate 33 of the construction 1 according to the above-described first embodiment. Further, since the recesses and protrusions 54A suffice to be an irregular rough surface, it is possible to employ, for example, a blasting process to form the recesses and protrusions 54A.

In the lighting device 30C illustrated in FIG. 11, the rays of light emitted from the light sources 31 in the +Z-axis direction enter into the light guide plate 33 through the light incident surface 331, and the rays of light are guided in the +Z-axis direction through the light guide plate 33 while being repeatedly, totally reflected by the first principal surface 332 and the second principal surface 333. Subsequently, the rays of light guided through the light guide plate 33 pass through or are diffracted by the interface between the first optical function layer 34B and the light guide plate 33, and subsequently enter into the first optical function layer 34B. Some of the rays of light guided through the first optical function layer 34B are scattered at the interface between the recesses and protrusions 54A and the air, and are able to exit outside from the first optical function layer 34B. Hence, even in a case where the recesses and protrusions 54A are included in the light extractor 50C in the lighting device 30C as illustrated in FIG. 11, the light extractor 50C allows the rays of light to exit from the recesses and protrusions 54A of the first optical function layer 34B to the interior of the construction.

Fourth Embodiment

The construction according to the fourth embodiment of the disclosure will be described. In the construction according to the embodiment, the light extractor 50A included in the lighting device 30A of the construction 1 according to the above-described first embodiment is provided on the first principal surface 332 of the light guide plate 33.

Figure 12:
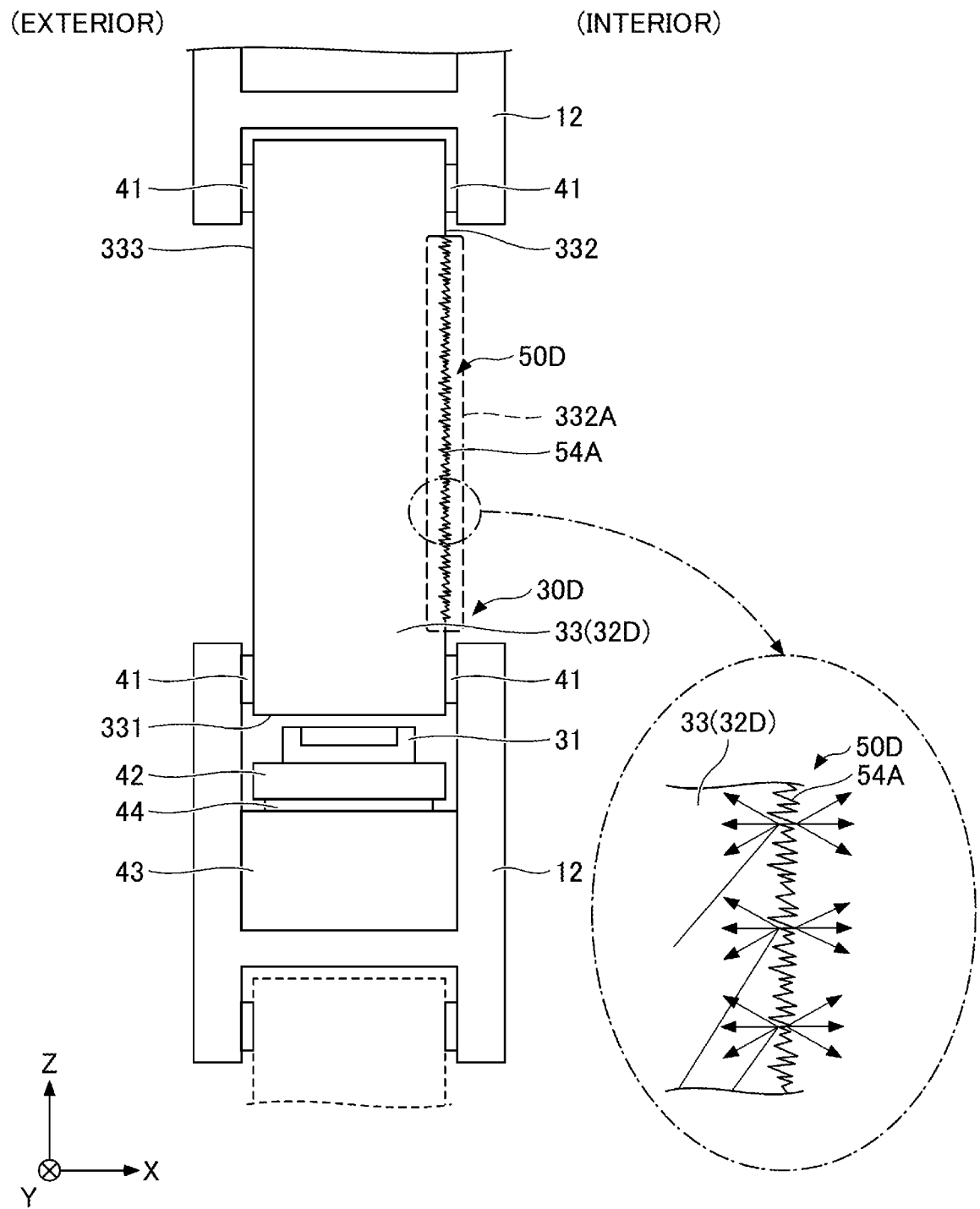
FIG. 12 is a view of a state in which the lighting device included in the construction according to the fourth embodiment of the present disclosure is fitted to the framework as seen from the Y-axis direction.

FIG. 12 is a view of a state in which a lighting device included in the construction according to the embodiment is fitted to the framework as seen from the Y-axis direction. As illustrated in FIG. 12, a lighting device 30D included in the construction according to the embodiment is a lighting device in which the light extractor 50A, which is provided in the light guide plate 33 of the lighting device 30A of the construction 1 according to the above-described first embodiment, has been changed to a light extractor 50D, which is provided in the first principal surface 332 of the light guide plate 33. Also, the light guide 32A has been changed into a light guide 32D, which is provided in the light extractor 50D on the first principal surface 332 of the light guide plate 33.

The light extractor 50D includes the recesses and protrusions 54A forming three-dimensional shapes on the first principal surface 332 of the light guide plate 33. Since the recesses and protrusions 54A are provided on the first principal surface 332 of the light guide plate 33, the area where the recesses and protrusions 54A are provided on the first principal surface 332 can function as the first light-emitting portion 332A.

The recesses and protrusions 54A include a plurality of recesses and protrusions each having a width and a height of 1 μm to 50 μm. The recesses and protrusions 54A are formed irregularly on the first principal surface 332 and are able to scatter the rays of light guided through the light guide plate 33 toward the interior of the construction.

The recesses and protrusions 54A can be formed on the light guide plate 33 by employing a method similar to the method for forming a micropattern on the second film 34-2 of the light guide plate 33 of the construction 1 according to the above-described first embodiment. Further, since the recesses and protrusions 54A suffice to be a random rough surface, it is possible to employ, for example, a blasting process to form the recesses and protrusions 54A.

In the lighting device 30D, the rays of light emitted from the light sources 31 in the +Z-axis direction enter into the light guide plate 33 through the light incident surface 331. The rays of light are guided through the light guide plate 33 in the +Z-axis direction while being repeatedly, totally reflected by the first principal surface 332 and the second principal surface 333. Some of the rays of light guided through the light guide plate 33 are scattered at the interface between the recesses and protrusions 54A and the air, and these rays of light are able to exit outside (toward the interior of the construction) from the recesses and protrusions 54A.

In this manner, the construction according to the embodiment includes the framework 10 and the plurality of the panels 20, and the lighting device 30C is used as one or more of the panels 20. In a similar manner to the lighting device 30A of the construction 1 according to the above-described first embodiment, the lighting device 30C includes the light sources 31 and the light guide plate 33. The light guide plate 33 includes the light incident surface 331, the first principal surface 332, and the second principal surface 333. Hence, in a similar manner to the construction 1 according to the above-described first embodiment, the construction according to the embodiment is able to maintain a high level of design while allowing good visibility from inside the construction to the outside as well as from the outside to inside the construction and while also allowing the lighting device 30D to function as a light for lighting the interior of the construction.

Further, in the construction according to the embodiment, the lighting device 30D includes the light extractor 50D on the first principal surface 332 of the light guide plate 33. Since the light extractor 50D includes the recesses and protrusions 54A on the first principal surface 332, the rays of light guided in the light guide plate 33 are able to reliably exit from the recesses and protrusions 54A to the interior of the construction.

Figure 13:
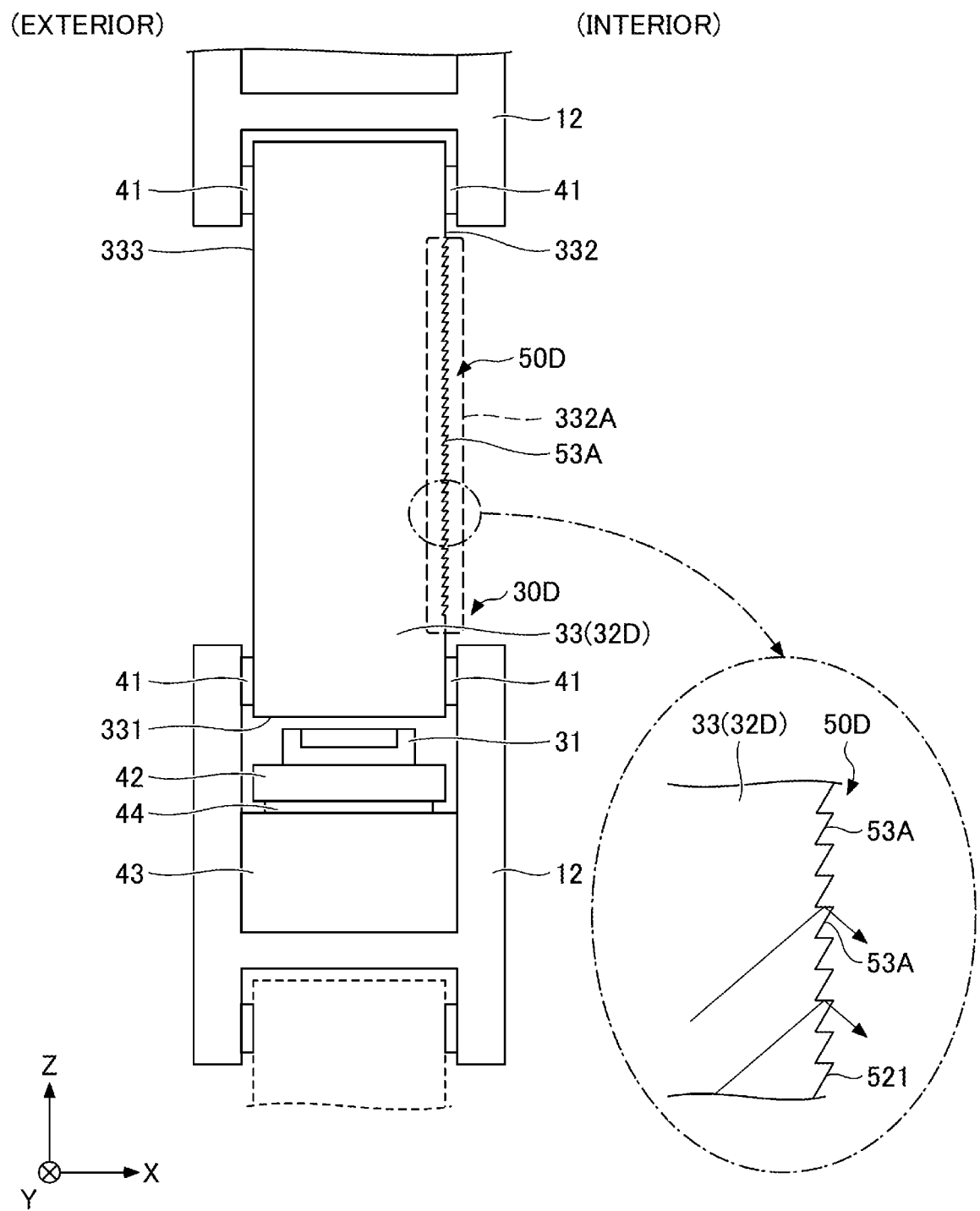
FIG. 13 is a view illustrating an example of another configuration of the lighting device as seen from the Y-axis direction.

Note that in this embodiment, the light extractor 50D may include the prisms 53A instead of the recesses and protrusions 54A as illustrated in FIG. 13. The prisms 53A can be configured in the same manner as the prisms 53A of the lighting device 30C included in the construction according to the above-described third embodiment. Hence, a detailed description of the prisms 53A will be omitted. A similar method as that used to form the recesses and protrusions 54A can be employed to form the prisms 53A.

In the lighting device 30D illustrated in FIG. 13, the rays of light emitted from the light sources 31 in the +Z-axis direction enters into the light guide plate 33 through the light incident surface 331, and the rays of light are guided through the light guide plate 33 in the +Z-axis direction while being repeatedly, totally reflected by the first principal surface 332 and the second principal surface 333. Some of the rays of light guided through the light guide plate 33 are scattered at the interface between the prisms 53A and the air, and are able to exit outside (toward the interior of the construction) from the prisms 53A. Hence, even in a case where the light extractor 50D includes the prisms 53A, the lighting device 30D illustrated in FIG. 13 is able to use the light extractor 50D to allow the rays of light to exit from the prisms 53A into the interior of the construction.

Fifth Embodiment

The construction according to the fifth embodiment of the disclosure will be described. In the construction according to this embodiment, a second optical function layer is provided on the exterior of the second principal surface 333 of the light guide plate 33 included in the construction 1 of the above-described first embodiment, and the light extractor 50A is included in the second optical function layer.

Figure 14:
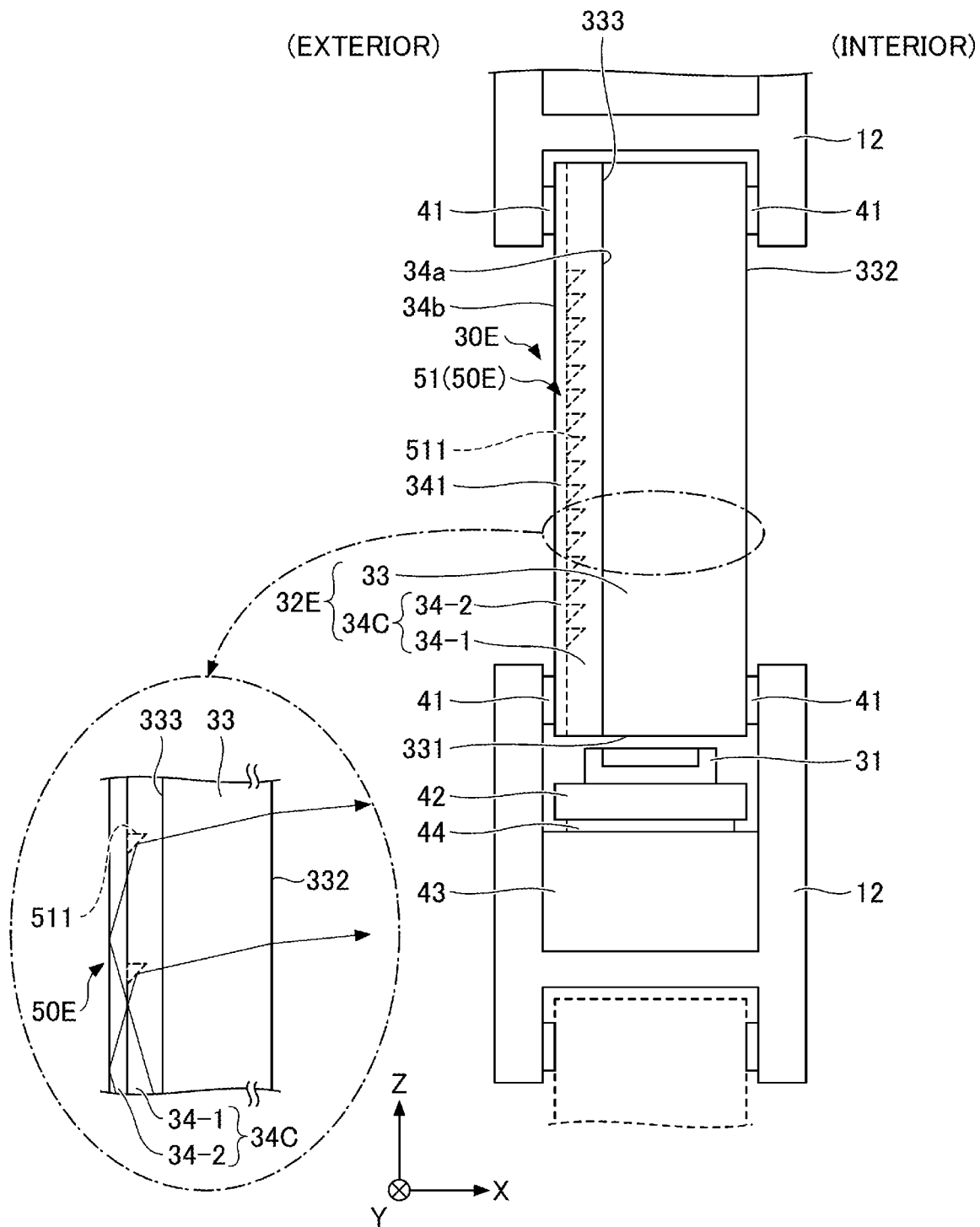
FIG. 14 is a view of a state in which the lighting device included in the construction according to the fifth embodiment of the present disclosure is fitted to the framework as seen from the Y-axis direction.

FIG. 14 is a view of a state in which the lighting device included by the construction according to the embodiment is fitted to the framework as seen from the Y-axis direction. As illustrated in FIG. 14, instead of the light guide 32A in the lighting device 30A included in the construction 1 according to the above-described first embodiment, a lighting device 30E of the construction according to the embodiment includes a light guide 32E, which includes the light guide plate 33 and a second optical function layer 34C provided on the exterior of the second principal surface 333 of the light guide plate 33. Further, instead of the light extractor 50A provided in the light guide plate 33, a light extractor 50E is included in the second optical function layer 34C.

The light guide 32E includes the light guide plate 33 and the second optical function layer 34C provided on the second principal surface 333 of the light guide plate 33.

The second optical function layer 34C is provided on the second principal surface 333 of the light guide plate 33. In the second optical function layer 34C, the rays of light that entered from the entrance surface 34a, which faces the second principal surface 333, are able to exit in the direction of the first principal surface 332 of the light guide plate 33.

The light extractor 50E includes the gap portion 51 formed by the plurality of gaps 511 in the second optical function layer 34C. The gap portion 51 includes the gaps 511 configured to allow the rays of light that entered from the entrance surface 34a of the second optical function layer 34C to exit in the direction of the first principal surface of the light guide plate 33.

In the lighting device 30E, the rays of light emitted from the light sources 31 in the +Z-axis direction enter into the light guide plate 33 through the light incident surface 331, and the rays of light are guided through the light guide plate 33 in the +Z-axis direction while being repeatedly, totally reflected by the first principal surface 332 and the second principal surface 333.

The rays of light guided in the light guide plate 33 pass through or are diffracted by the interface at the light guide plate 33 and the second optical function layer 34C, and subsequently enter into the second optical function layer 34C. Some of the rays of light guided through the second optical function layer 34C are reflected at the interface between the second optical function layer 34C and the gaps 511. Some of these reflected rays of light are reflected toward the first principal surface 332 and pass through the second optical function layer 34C and the light guide plate 33. The rays of light guided through the second optical function layer 34C and the light guide plate 33 are able to exit from the first principal surface 332 toward the +X-axis direction.

In this manner, the construction according to the embodiment includes the framework 10 and the plurality of panels 20, and the lighting device 30E is used as one or more of the panels 20. In a similar manner to the lighting device 30A of the construction 1 according to the above-described first embodiment, the lighting device 30E includes the light sources 31 and the light guide plate 33. The light guide plate 33 includes the light incident surface 331, the first principal surface 332, and the second principal surface 333. Hence, in a similar manner to the construction 1 according to the above-described first embodiment, the construction according to this embodiment is able to maintain a high level of design while allowing good visibility from inside the construction to the outside as well as from the outside to inside the construction and while also allowing each lighting device 30E to function as a light for lighting the interior of the construction.

Further, in the construction according to the embodiment, the lighting device 30E includes the light guide 32E that includes the second optical function layer 34C provided on the second principal surface 333 of the light guide plate 33. In addition, the light extractor 50E including the gap portion 51 is provided in the first optical function layer 34A. As a result, the rays of light guided through the second optical function layer 34C can be reflected toward the first principal surface 332 by the gap portion 51. Hence, in the construction according to the embodiment, the rays of light reflected in the light guide plate 33 are able to exit from the first principal surface 332 of the light guide plate 33.

Furthermore, since the second optical function layer 34C is capable of transmitting visible light in a similar manner to the light guide plate 33, a person inside the construction can see the outside through the light guide plate 33, and a person who is outside the construction can see inside the construction through the guide plate 33. Hence, it is possible to inhibit the reduction in the visibility from inside the construction to the outside and in the visibility from the outside to inside the construction.

Figure 15:
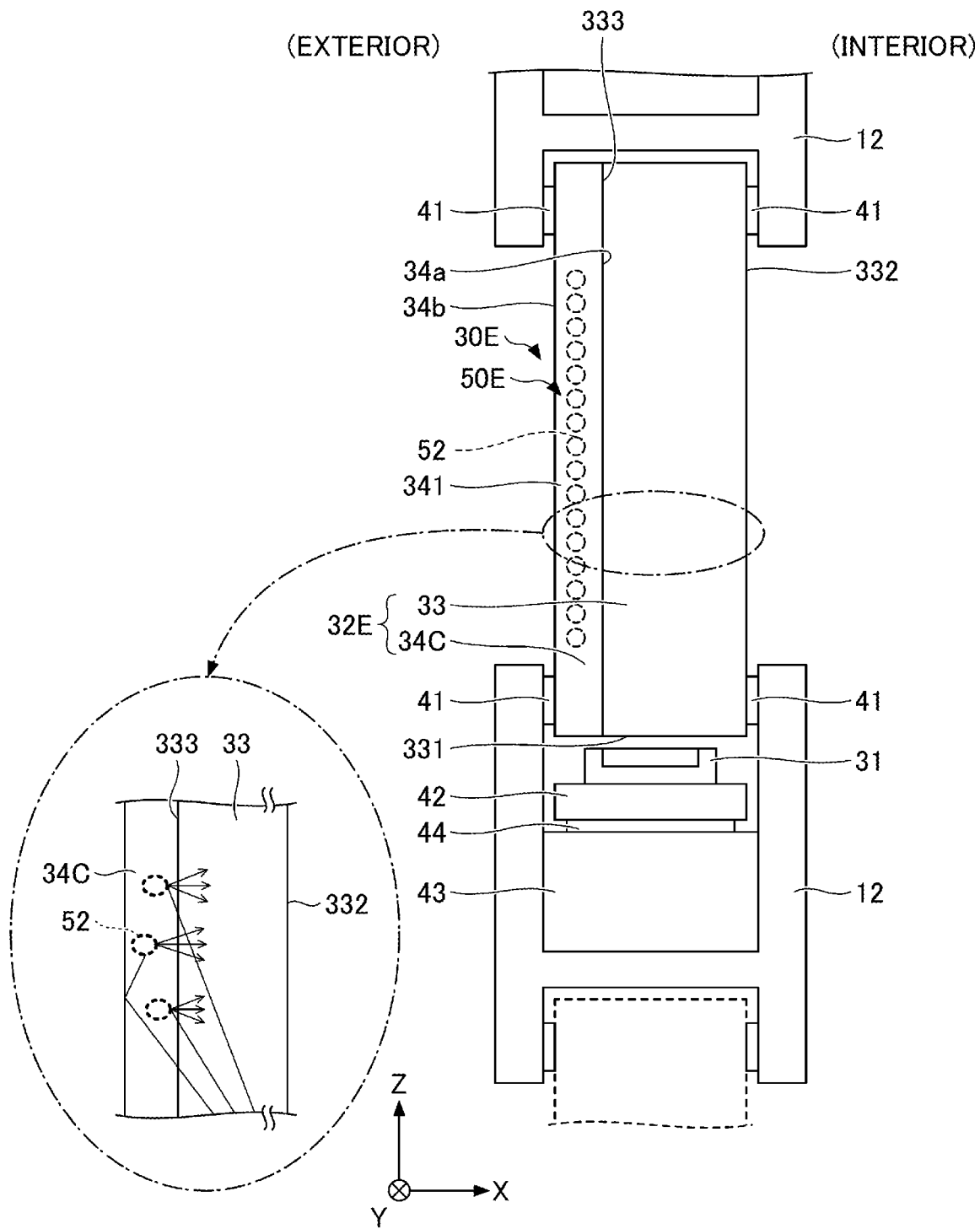
FIG. 15 is a view illustrating an example of another configuration of the lighting device as seen from the Y-axis direction.

Note that in the embodiment, as illustrated in FIG. 15, the light extractor 50E includes, instead of the gap portion 51, the light scattering particles 52 in the second optical function layer 34C. The light scattering particles 52 have a refractive index difference with respect to the material composing the second optical function layer 34C. The light scattering particles 52 are particles with an average particle size of 0.3 μm to 5 μm, and are able to function as light scattering media that scatter the rays of light propagated through the second optical function layer 34C. The plurality of light scattering particles 52 can scatter the rays of light propagated through the second optical function layer 34C and allow the rays of light to exit from the first principal surface 332. Although the optical functional layer including the light scattering particles is not limited to a particular optical function layer, it is possible to use, for example, an optical function layer disclosed in Japanese Patent Application Publication Laid-Open No. 2013-195811. The contents thereof are incorporated by reference in this specification.

In the lighting device 30E illustrated in FIG. 15, the rays of light emitted from the light sources 31 in the +Z-axis direction enter into the light guide plate 33 through the light incident surface 331, and the rays of light are guided in the +Z-axis direction in the light guide plate 33 while being repeatedly, totally reflected by the first principal surface 332 and the second principal surface 333. The rays of light guided in the light guide plate 33 enter into the second optical function layer 34C by passing through or being diffracted at the interface of the light guide plate 33 and the second optical function layer 34C. Some of the rays of light guided through the second optical function layer 34C pass through the second optical function layer 34C and the light guide plate 33 by being scattered at the interface at the second optical function layer 34C and the light scattering particles 52. Among the rays of scattered light generated at the interface between the second optical function layer 34C and the light scattering particles 52, the rays of light that enter the first principal surface 332 at an angle that exceeds the critical angle are able to exit outside from the light guide plate 33 and are able to illuminate the interior of the construction 1. Note that the portion of the first principal surface 332 where the rays of light exit corresponds to the first light-emitting portion 332A.

The rays of light scattering at the interface between the second optical function layer 34C and the light scattering particles 52 are guided in the +Z-axis direction while being repeatedly, totally reflected at the interface between the second optical function layer 34C and the external air. Some of these rays of light are scattered at the interface between the second optical function layer 34C and the light scattering particles 52, and are able to exit outside from the second optical function layer 34C. Scattering of light occurs as described above in each of the plurality of light scattering particles 52 provided in the second optical function layer 34C.

In this manner, the light extractor 50E allows the rays of light to exit toward the +X-axis direction from the entire first light-emitting portion 332A along the plane of the first principal surface 332.

Sixth Embodiment

The construction according to the sixth embodiment of the disclosure will be described. In the construction according to this embodiment, the second optical function layer is provided on the exterior of the second principal surface 333 of the light guide plate 33 included in the construction 1 according to the above-described first embodiment, and the light extractor 50A is provided in the second optical function layer.

Figure 16:
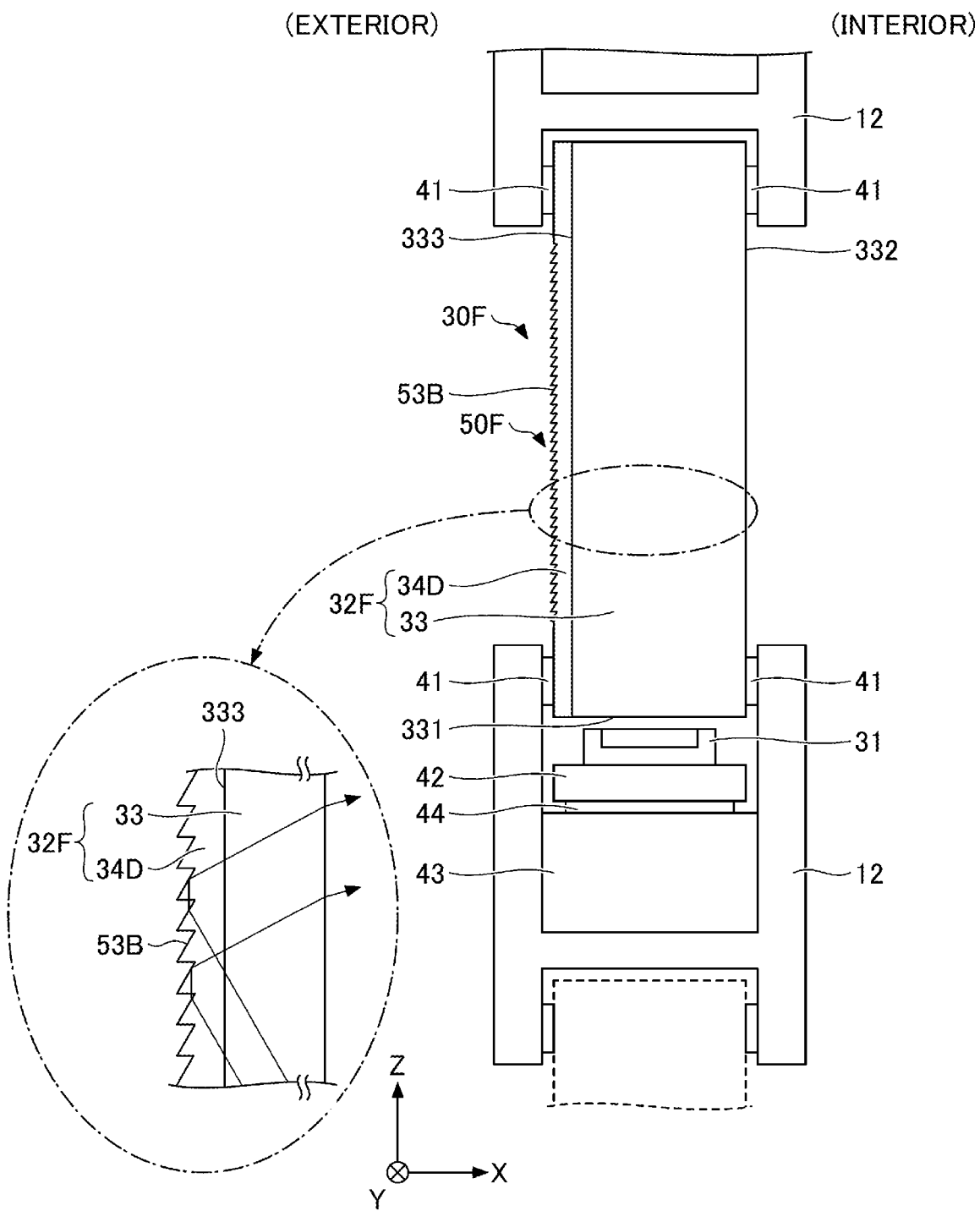
FIG. 16 is a view of a state in which the lighting device included in the construction according to the sixth embodiment of the present disclosure is fitted to the framework as seen from the Y-axis direction.

FIG. 16 is a view of a state in which the lighting device included in the construction according to the embodiment is fitted in the framework as seen from the Y-axis direction. As illustrated in FIG. 16, instead of the light guide 32A in the lighting device 30A of the construction 1 according to the above-described first embodiment, a lighting device 30F included in the construction according to the embodiment includes a light guide 32F, which includes the light guide plate 33 and a second optical function layer 34D provided on the exterior of the second principal surface 333 of the light guide plate 33. In addition, instead of the light extractor 50A provided in the light guide plate 33, a light extractor 50F is provided on the exit surface positioned on the opposite side of the second principal surface 333 of the second optical function layer 34D.

The light guide 32F includes the light guide plate 33 and the second optical function layer 34D that is provided on the second principal surface 333 of the light guide plate 33.

In the second optical function layer 34D, the rays of light that entered from the entrance surface 34a, which faces the second principal surface 333, are able to exit in the direction of the first principal surface 332 of the light guide plate 33.

The light extractor 50F includes prisms 53B on the exterior (−X-axis direction) surface of the second optical function layer 34D. Since the prisms 53B are similar to the prisms 53A included in the lighting device 30C of the construction according to the above-described third embodiment, a detailed description thereof will be omitted. Note that it is preferable for the angle of the inclined surface of each prism 53B to be set to an angle suitable for illuminating the interior of the construction. The prisms 53B can be formed on the second optical function layer 34D by using a method similar to the method employed to form a micropattern for the recesses and protrusions 54A on the first optical function layer 34B provided on the light guide plate 33 of the lighting device 30B included in the construction according to the above-described second embodiment. The second optical function layer 34D is able to use the prisms 53B to allow the rays of light that entered from the entrance surface 34a, which faces the second principal surface 333, to exit in the direction of the first principal surface 332 of the light guide plate 33.

In the lighting device 30F, the rays of light emitted from the light sources 31 in the +Z-axis direction enter into the light guide plate 33 through the light incident surface 331, and the rays of light are guided through the light guide plate 33 in the +Z-axis direction while being repeatedly, totally reflected by the first principal surface 332 and the second principal surface 333.

The rays of light guided through the light guide plate 33 pass through or are diffracted at the interface between the light guide plate 33 and the second optical function layer 34D, and enter into the second optical function layer 34D. Some of the rays of light guided in the second optical function layer 34D are reflected at the interface between the prisms 53B and the air. Some of these reflected rays of light are reflected toward the first principal surface 332 and pass through the second optical function layer 34C and the light guide plate 33. The rays of light guided in the second optical function layer 34D and the light guide plate 33 are able to exit from the first principal surface 332 toward the +X-axis direction.

In this manner, the construction according to the embodiment includes the framework 10 and the plurality of panels 20, and the lighting device 30F is used as one or more of the panels 20. In a similar manner to the lighting device 30A of the construction 1 according to the above-described first embodiment, the lighting device 30F includes the light sources 31 and the light guide plate 33, and the light guide plate 33 includes the light incident surface 331, the first principal surface 332, and the second principal surface 333. Hence, in a similar manner to the construction 1 according to the above-described first embodiment, the construction according to the embodiment is able to maintain a high level of design while allowing good visibility from inside the construction to the outside as well as from the outside to inside the construction and while also allowing each lighting device 30F to function as a light for lighting the interior of the construction.

Further, in the construction according to the embodiment, the lighting device 30F includes the light guide 32F that includes the second optical function layer 34D on the second principal surface 333 of the light guide plate 33, and the light extractor 50F is provided on the surface of the second optical function layer 34D. As a result, the rays of light guided in the second optical function layer 34D can be reflected toward the first principal surface 332 by the prisms 53B. Hence, in the construction according to the embodiment, the rays of light reflected in the light guide plate 33 are able to exit from the first principal surface 332 of the light guide plate 33.

Furthermore, in a similar manner to the light guide plate 33, the second optical function layer 34D is capable of transmitting visible light. Thus, a person who is inside the construction can see outside the construction through the light guide plate 33, and a person who is outside the construction can see inside the construction through the guide plate 33. Hence, it is possible to inhibit the reduction in the visibility from inside the construction to the outside and in the visibility from the outside to inside the construction.

Figure 17:
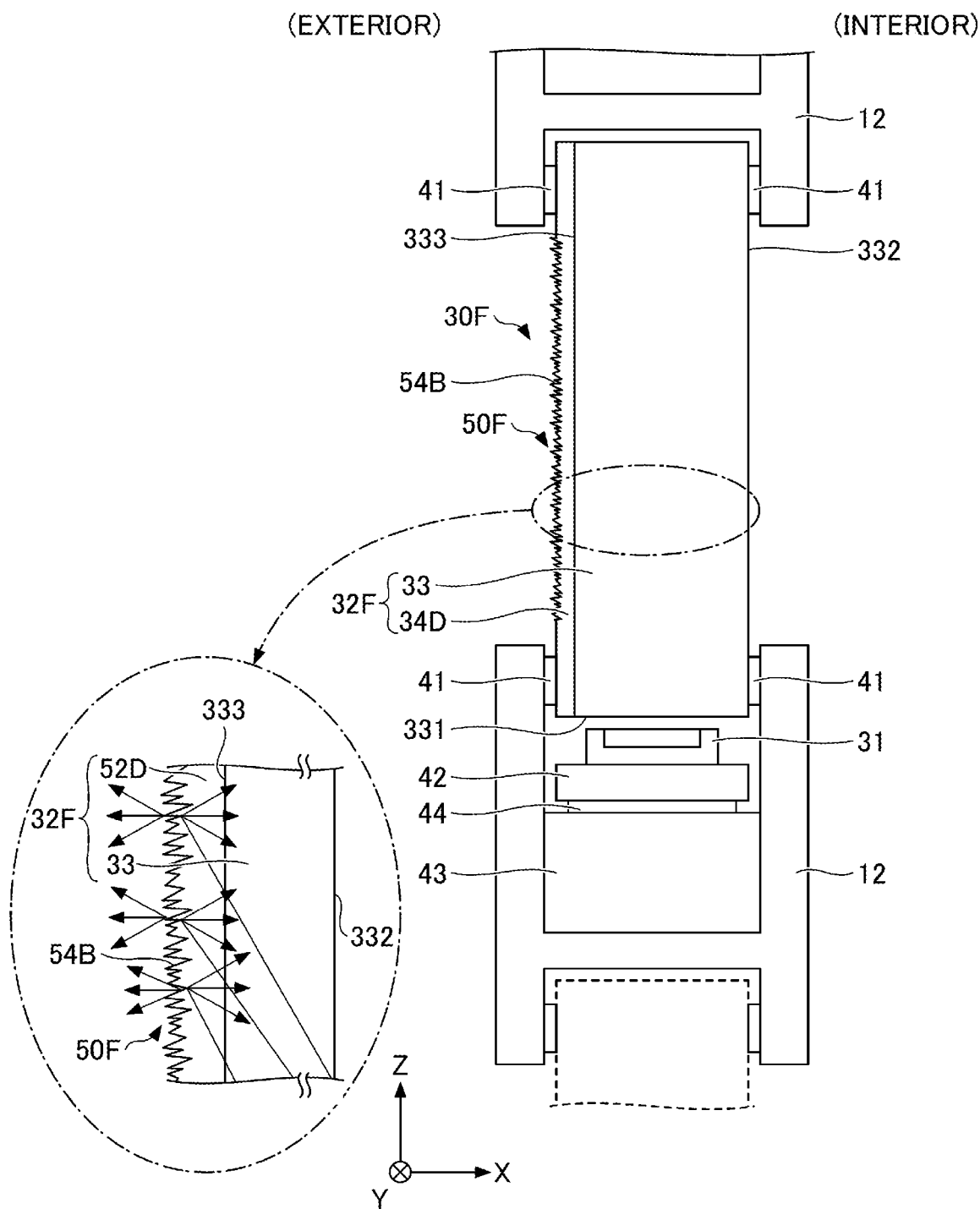
FIG. 17 is a view illustrating an example of another configuration of the lighting device as seen from the Y-axis direction.

Note that in the embodiment, as illustrated in FIG. 17, the light extractor 50F may include recesses and protrusions 54B instead of the prisms 53B. The recesses and protrusions 54B can be configured in a similar manner to the recesses and protrusions 54B of the lighting device 30C included in the construction according to the above-described third embodiment. Hence, a detailed description of the recesses and protrusions 54B will be omitted.

In the lighting device 30F illustrated in FIG. 17, the rays of light emitted from the light sources 31 in the +Z-axis direction enter into the light guide plate 33 through the light incident surface 331, and the rays of light are guided through the light guide plate 33 in the +Z-axis direction while being repeatedly, totally reflected by the first principal surface 332 and the second principal surface 333. Subsequently, the rays of light guided through the light guide plate 33 pass through or are diffracted at the interface between the light guide plate 33 and the second optical function layer 34D, and the rays of light enter into the second optical function layer 34D. The rays of light guided in the second optical function layer 34D are reflected toward the first principal surface 332 by the recesses and protrusions 54B, and pass through the second optical function layer 34D and the light guide plate 33. The rays of light guided through the second optical function layer 34D and the light guide plate 33 exit toward +X-axis direction from the first principal surface 332. Hence, in the lighting device 30F illustrated in FIG. 17, even in a case where the light extractor 50F includes the recesses and protrusions 54B, the light extractor 50F allows the rays of light to exit from the recesses and protrusions 54B of the second optical function layer 34D to the interior of the construction.

Seventh Embodiment

The construction according to the seventh embodiment of the disclosure will be described. In the construction according to the embodiment, the light extractor 50A included in the lighting device 30A of the construction 1 according to the above-described first embodiment is provided on the second principal surface 333 of the light guide plate 33.

Figure 18:
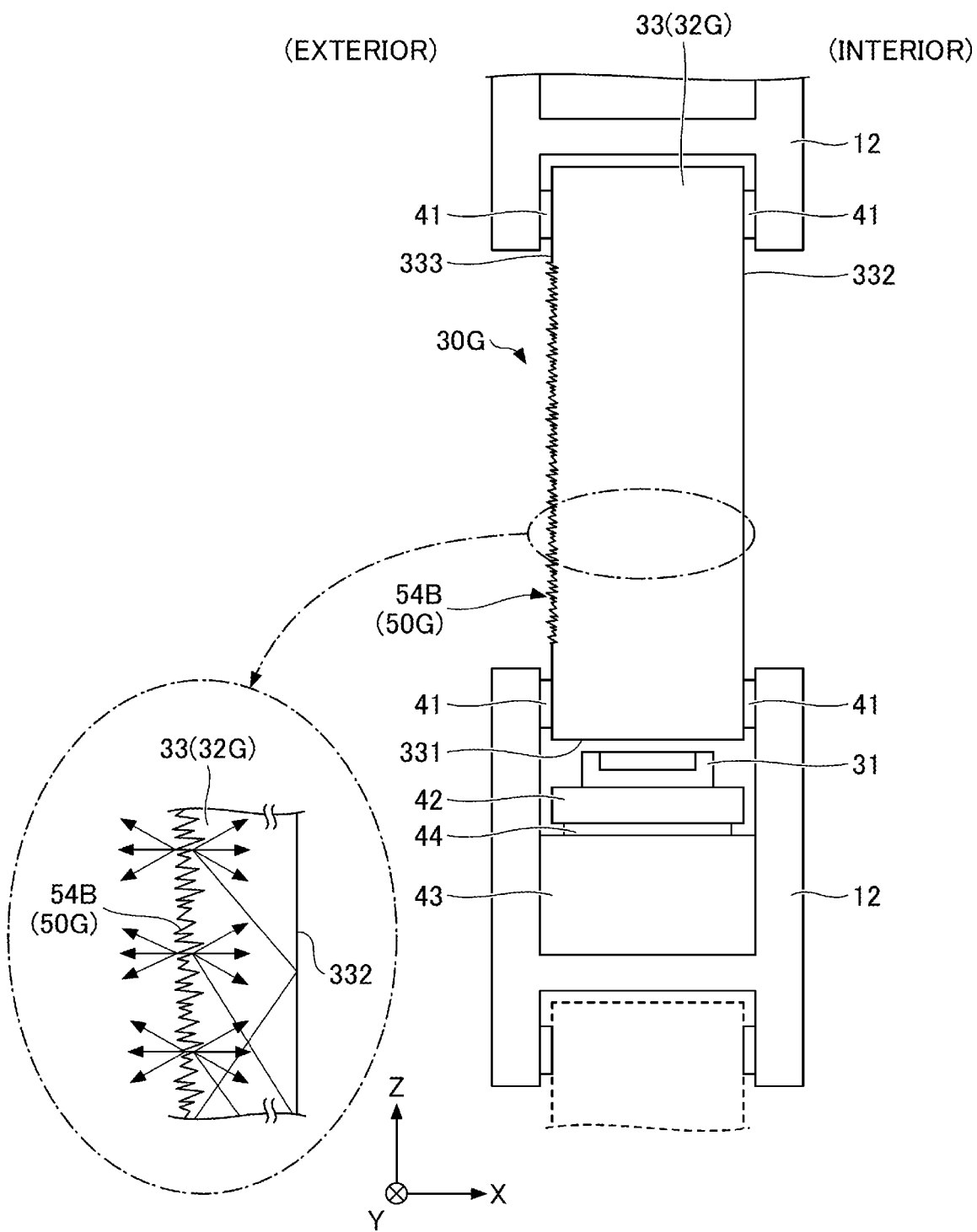
FIG. 18 is a view of a state in which the lighting device included in the construction according to the seventh embodiment of the present disclosure is fitted to the framework as seen from the Y-axis direction.

FIG. 18 is a view of a state in which the lighting device according to the construction according to the embodiment is fitted to the framework as seen from the Y-axis direction. As illustrated in FIG. 18, a lighting device 30G included in the construction according to the embodiment is a lighting device in which the light extractor 50A, which is provided in the light guide plate 33 of the lighting device 30A of the construction 1 according to the above-described first embodiment, has been changed to a light extractor 50G, which is provided in the second principal surface 333 of the light guide plate 33. Also, the light guide 32A has been changed into a light guide 32G, which is provided in the light extractor 50G on the second principal surface 333 of the light guide plate 33.

The light extractor 50G includes the recesses and protrusions 54B formed three-dimensionally on the second principal surface 333 of the light guide plate 33. Note that the light extractor 50G may include another configuration other than the recesses and protrusions 54B. As the recesses and protrusions 54B are similar to the recesses and protrusions 54A included in the lighting device 30C of the construction according to the above-described third embodiment, a detailed description thereof will be omitted. The recesses and protrusions 54B can be formed on the second principal surface 333 by using a similar method as that employed to form the recesses and protrusions 54A on the first optical function layer 34B that is provided on the light guide plate 33 of the lighting device 30B included in the construction according to the above-described second embodiment.

In the lighting device 30G, the rays of light emitted from the light sources 31 in the +Z-axis direction enter into the light guide plate 33 through the light incident surface 331, and the rays of light are guided through the light guide plate 33 in the +Z-axis direction while being repeatedly, totally reflected by the first principal surface 332 and the second principal surface 333. The rays of light guided through the light guide plate 33 are reflected toward the first principal surface 332 at the interface between the recesses and protrusions 54B and the air, and the rays of light guided in the light guide plate 33 are able to exit from the first principal surface 332 to the interior of the construction.

In this manner, the construction according to the embodiment includes the framework 10 and the plurality of panels 20, and the lighting device 30G is used as one or more of the panels 20. In the same manner as the lighting device 30A of the construction 1 according to the above-described first embodiment, the lighting device 30G includes the light sources 31 and the light guide plate 33, and the light guide plate 33 includes the light incident surface 331, the first principal surface 332, and the second principal surface 333. Hence, in the same manner as the construction 1 according to the above-described first embodiment, the construction according to the embodiment is able to maintain a high level of design while allowing good visibility from the inside to the outside as well as from the outside to the inside of the construction and while also allowing each lighting device 30G to function as a light for lighting the inside of the construction.

Further, in the construction according to the embodiment, the lighting device 30G includes the light extractor 50G provided on the second principal surface 333 of the light guide plate 33. By forming the light extractor 50G by the prisms 53B, the rays of light guided in the light guide plate 33 can be reflected toward the first principal surface 332 by the prisms 53B. Hence, in the construction according to the embodiment, the rays of light reflected in the light guide plate 33 are able to exit reliably from the first principal surface 332 of the light guide plate 33.

Furthermore, the second optical function layer 34D is capable of transmitting visible light in a similar manner to the light guide plate 33. Thus, a person who is inside the construction can see outside the construction through the light guide plate 33, and a person who is outside the construction can see inside the construction through the guide plate 33. Hence, it is possible to inhibit the reduction in the visibility from inside the construction to the outside and in the visibility from the outside to inside the construction.

Figure 19:
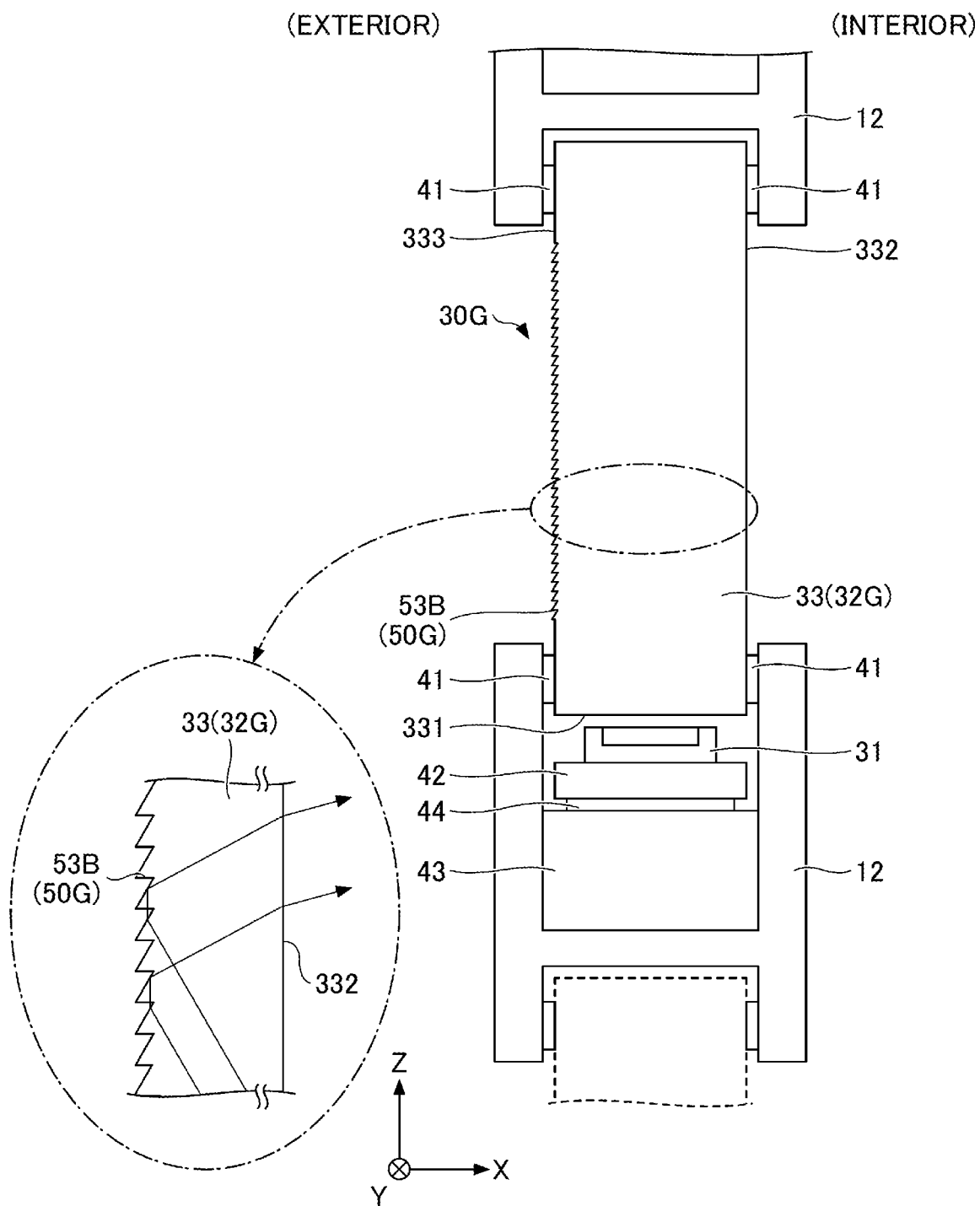
FIG. 19 is a view illustrating an example of another configuration of the lighting device as seen from the Y-axis direction.

Note that in this embodiment, as illustrated in FIG. 19, the light extractor 50G may include the prisms 53B instead of the recesses and protrusions 54B. The prisms 53B can be configured in a similar manner to the prisms 53A of the lighting device 30C included in the construction according to the above-described third embodiment. Hence, a detailed description of the prisms 53B will be omitted.

In the lighting device 30G illustrated FIG. 19, the rays of light emitted from the light sources 31 in the +Z-axis direction enter into the light guide plate 33 through the light incident surface 331, and the rays of light are guided through the light guide plate 33 in the +Z-axis direction while being repeatedly, totally reflected by the first principal surface 332 and the second principal surface 333. Subsequently, the rays of light guided through the light guide plate 33 are reflected toward the first principal surface 332 at the interface between the prisms 53B and the air, and the rays of light guided in the light guide plate 33 exit from the first principal surface 332 to the interior of the construction. Hence, even in a case where the light extractor 50G includes the prisms 53B, the lighting device 30G illustrated in FIG. 19 is able to use the light extractor 50G to allow the rays of light to exit from the prisms 53B to the interior of the construction.

Eighth Embodiment

The construction according to the eighth embodiment of the disclosure will be described. In the construction according to the embodiment, a low refractive index layer is provided on the second principal surface 333-side of the light guide plate 33 of the lighting device 30A included in the construction 1 according to the above-described first embodiment.

Figure 20:
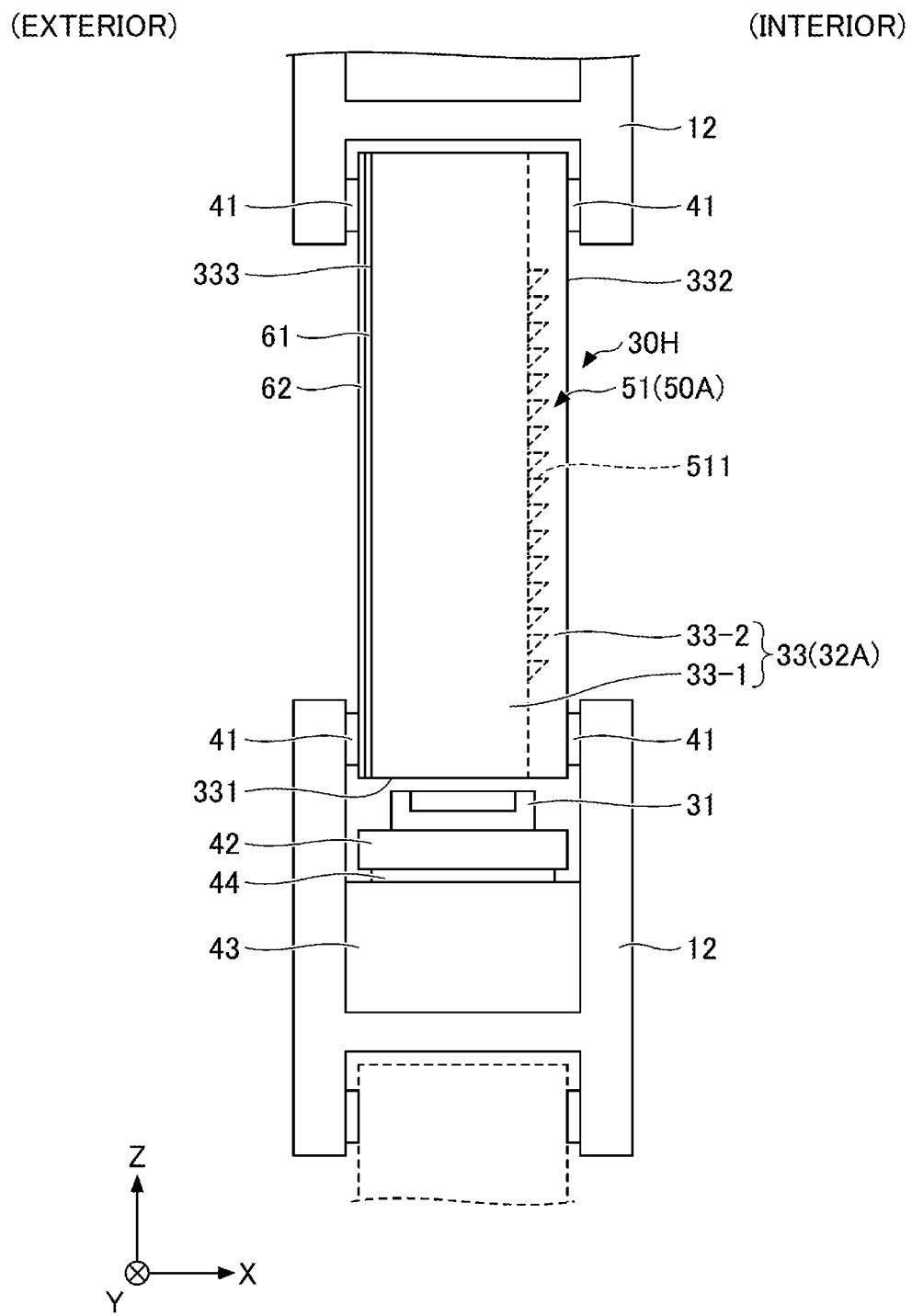
FIG. 20 is a view of a state in which the lighting device included in the construction according to the eighth embodiment of the present disclosure is fitted to the framework as seen from the Y-axis direction.

FIG. 20 is a view of a state in which the lighting device included in the construction according to the embodiment is fitted in the framework as seen from the Y-axis direction. As illustrated in FIG. 20, in a lighting device 30H included in the construction according to the embodiment, a low refractive index layer 61 and a cover layer 62 are stacked, in this order, on the second principal surface 333 of the light guide plate 33 of the lighting device 30A included in the construction 1 according to the above-described first embodiment. Note that a layer that has another function may be included between the surface of the light guide plate 33 and the low refractive index layer 61. The low refractive index layer 61 may also be bonded to the light guide plate 33 by an adhesive agent such as a pressure-sensitive adhesive agent.

The low refractive index layer 61 is a layer that has a refractive index that is lower than the refractive index of the light guide plate 33. For example, in a case where the light guide plate 33 is composed of mainly PMMA, a refractive index n1 of the light guide plate 33 is approximately 1.49. In this case, a refractive index n2 of the low refractive index layer 61 is preferably 1.30 or lower, and is more preferably 1.20 or lower.

The low refractive index layer 61 suffices to have a refractive index that is lower than the refractive index of the light guide plate 33. For example, a low refractive index layer that includes gaps as disclosed in PCT International Application Publication No. 2019/146628 can be used. The contents thereof are incorporated into this specification by reference.

When the angle of incidence to the low refractive index layer 61 of each ray of light guided through the light guide plate 33 is larger than the critical angle (when the ray of light guided through the light guide plate 33 enters the low refractive index layer at a small angle), the condition for total internal reflection is satisfied. Hence, the low refractive index layer 61 totally reflects the rays of light at the interface between the light guide plate 33 and the low refractive index layer 61. Here, a critical angle θc is expressed by equation (1) as follows.

$$\theta c = \theta i = \arcsin(n_2/n_1) \quad (1)$$

where θi is the angle of incidence (angle from a normal).

The cover layer 62 is a layer for protecting the light guide plate 33 and is, preferably, highly capable of transmitting visible light. The cover layer 62 can be manufactured by using the same material as the light guide plate 33. Further, the cover layer 62 may also have an ultraviolet absorption effect. The cover layer 62 is preferably high in strength in the interest of serving as a protective layer, but may be thin and flexible.

In the construction according to the embodiment, the lighting device 30H includes the low refractive index layer 61 on the second principal surface 333 of the light guide plate 33. Hence, the loss of the rays of light guided in the light guide plate 33 due to, for example, scratches, dirt, or fingerprints can be reduced. Therefore, the efficiency of using the rays of light emitted from the light sources 31 can be improved.

Further, in the construction according to the embodiment, the lighting device 30H includes the low refractive index layer 61 between the light guide plate 33 and the cover layer 62. Hence, it is possible to reduce a state in which the rays of light that are guided through the light guide plate 33 will reach foreign matter C attached to the surface of the cover layer 62.

Figure 21:
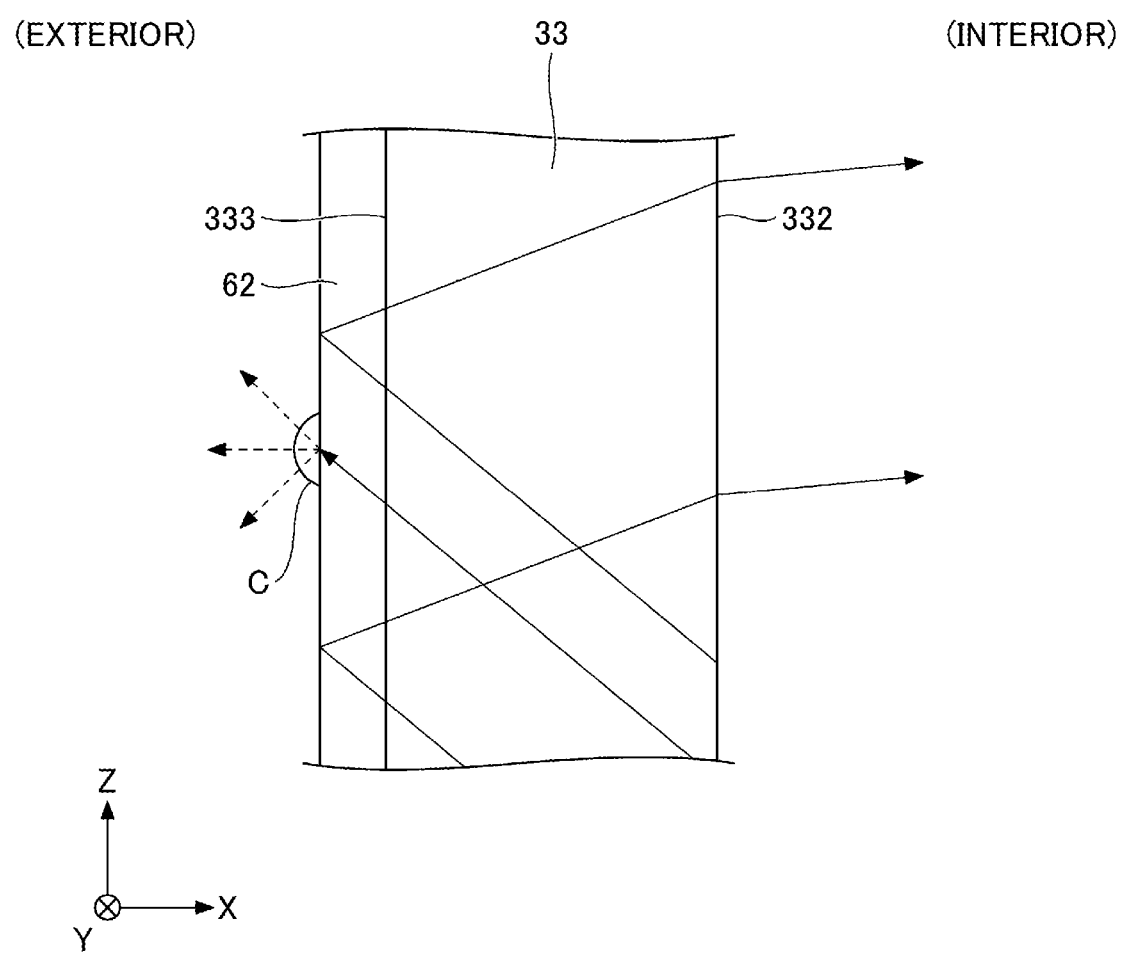
FIG. 21 is a view illustrating the vicinity of the surface of a light guide plate without a low refractive index layer.
Figure 22:
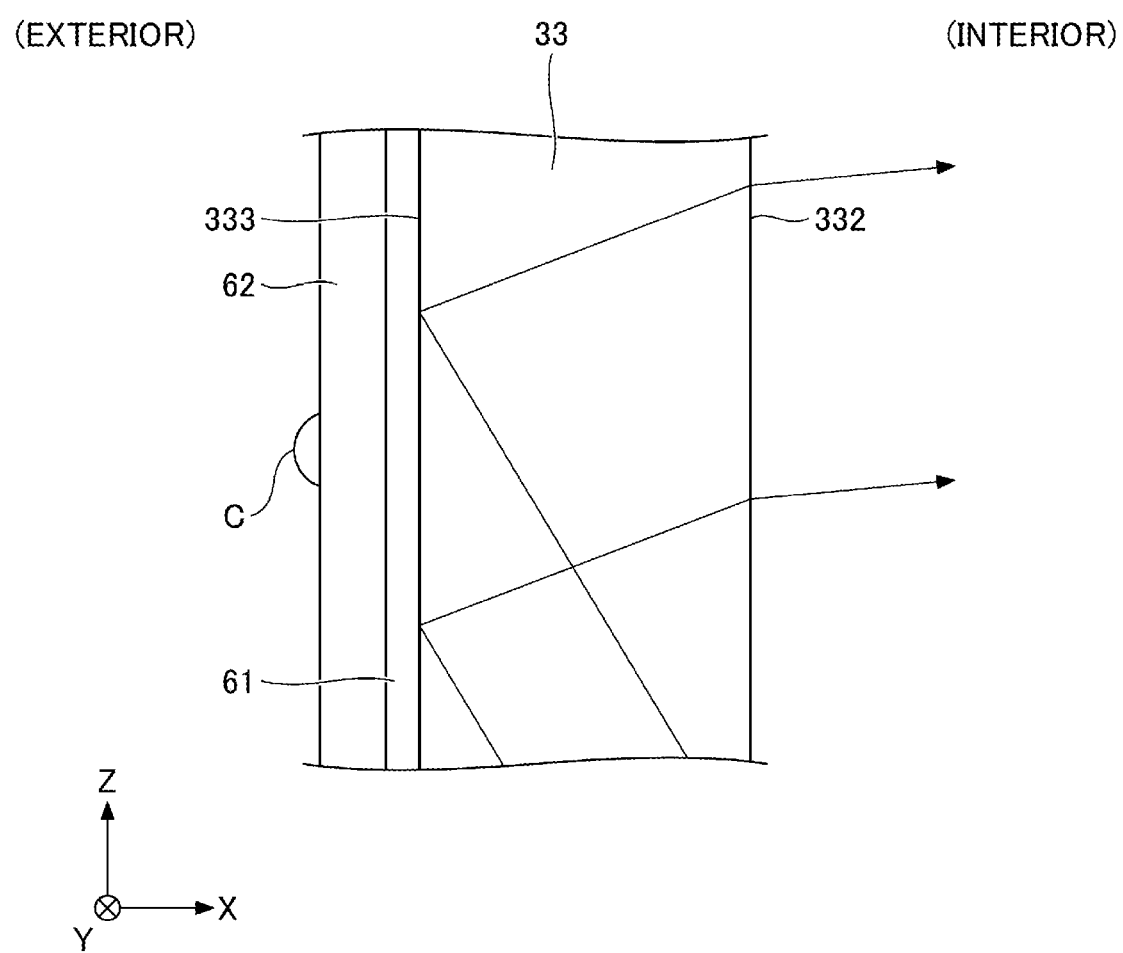
FIG. 22 is a view illustrating the vicinity of the surface of the light guide plate with the low refractive index layer.

For example, as illustrated in FIG. 21, in a case where the cover layer 62 is provided but the low refractive index layer 61 is not provided on the surface of the light guide plate 33, when foreign matter such as a scratch, dirt, a fingerprint, or dust is attached to the surface of the cover layer 62, the rays of light that travel toward the cover layer 62 among the rays of light guided through the light guide plate 33 may be scattered by the foreign matter, and the rays of light may leak outside from the light guide plate 33. As a result, light loss may occur. In the construction according to the embodiment, the lighting device 30H includes, for example, as illustrated in FIG. 22, the low refractive index layer 61 between the cover layer 62 and the light guide plate 33. Hence, even when foreign matter attaches to the surface of the cover layer 62, it is possible to reduce the rays of light guided in the light guide plate 33 that will reach the foreign matter attached to the surface of the cover layer 62. As a result, it is possible to reduce loss of light emitted from the light sources 31.

Therefore, by including the lighting device 30H in the construction according to the embodiment, the lighting device 30H is able to function more effectively as a light for lighting the interior of the construction.

Note that in the embodiment, the low refractive index layer 61 may be provided on at least a portion of the second principal surface 333.

Figure 23:
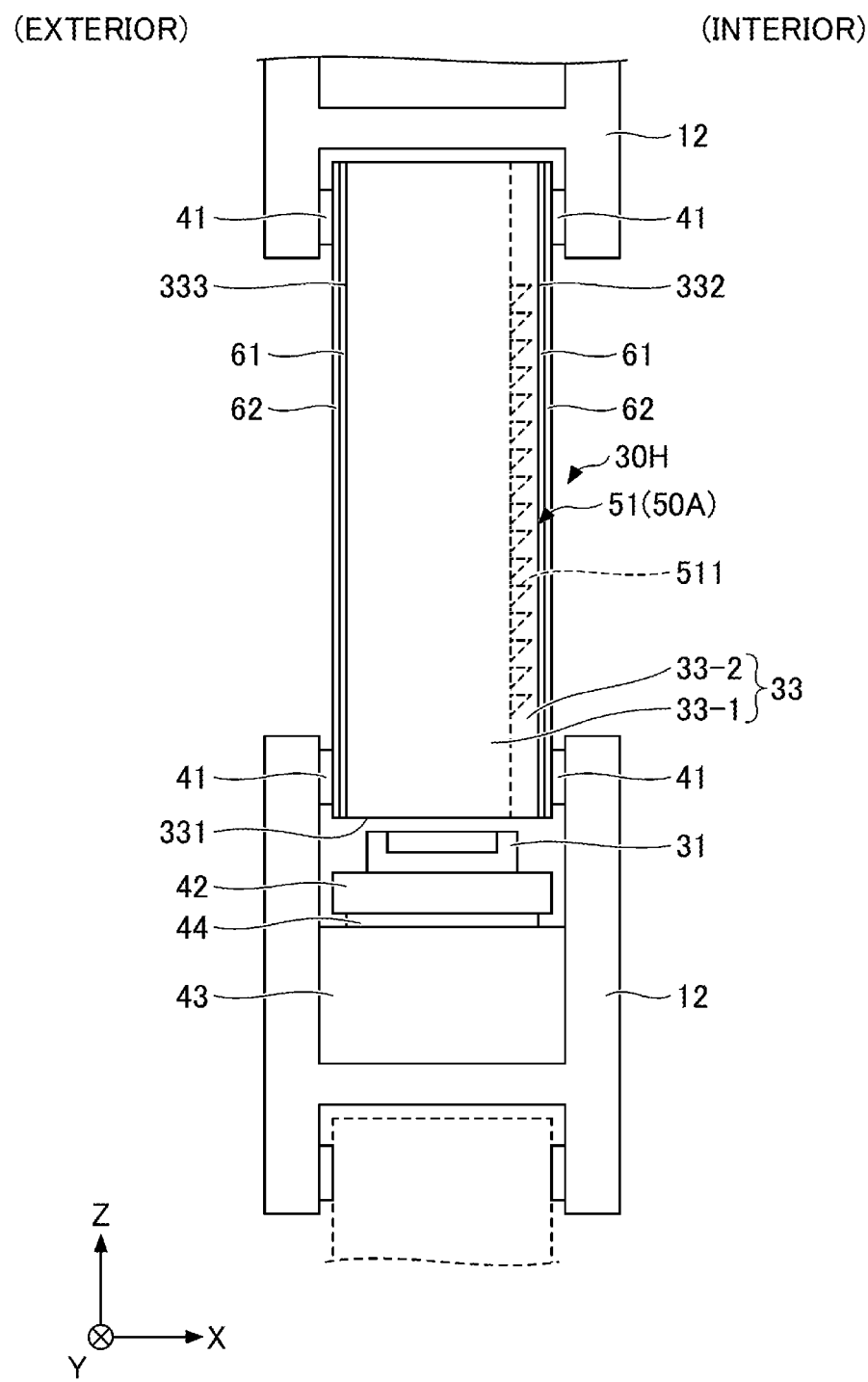
FIG. 23 is a view illustrating another configuration of the lighting device as seen from the Y-axis direction.
Figure 24:
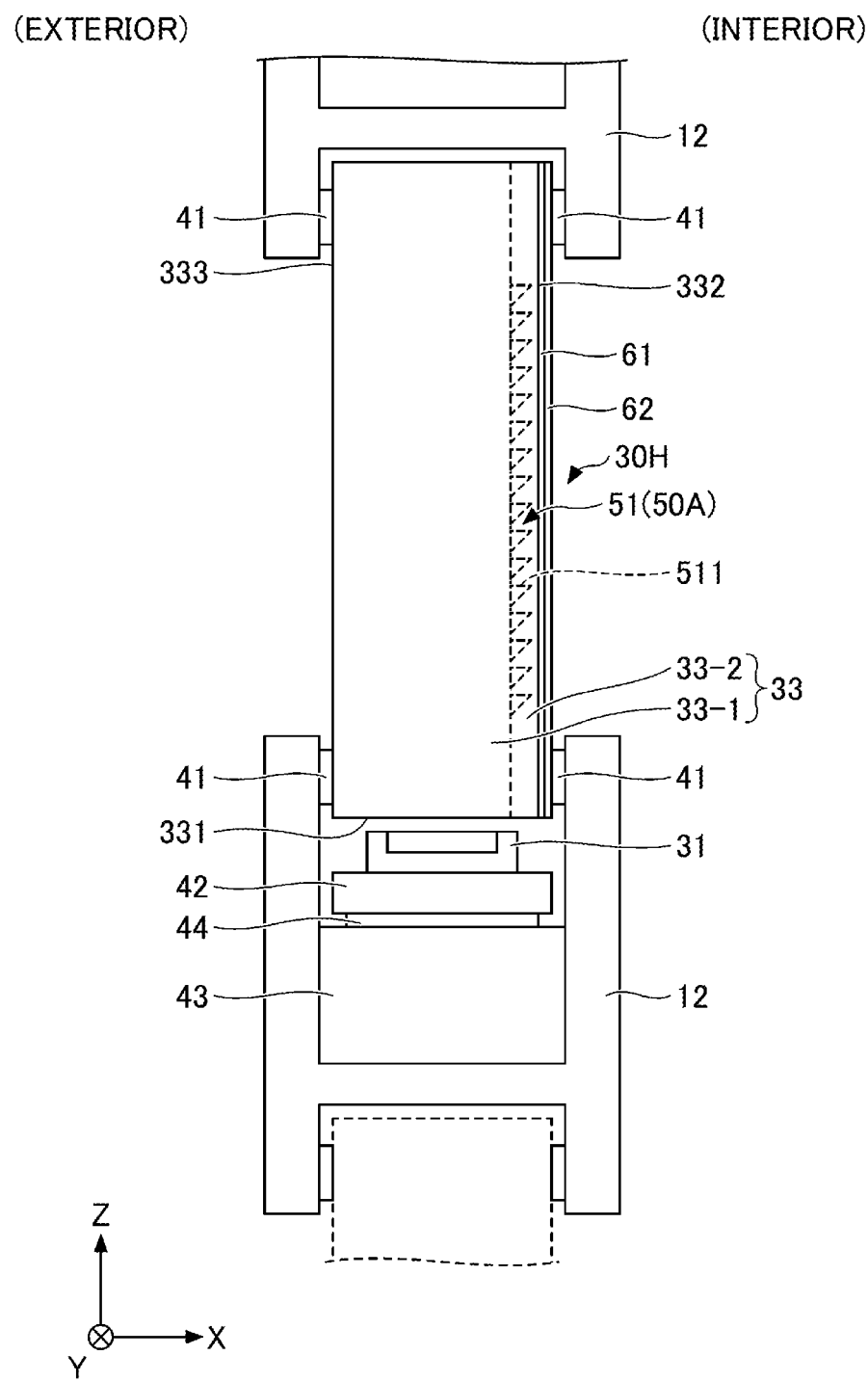
FIG. 24 is a view illustrating yet another configuration of the lighting device as seen from the Y-axis direction.

In the embodiment, the low refractive index layer 61 suffices to be provided on at least either the first principal surface 332-side of the light guide plate 33 or the second principal surface 333-side of the light guide plate 33. For example, as illustrated in FIG. 23, the low refractive index layer 61 may be provided on both the first principal surface 332 and the second principal surface 333 of the light guide plate 33. Alternatively, as illustrated in FIG. 24, the low refractive index layer 61 may be provided on the first principal surface 332 of the light guide plate 33.

In this embodiment, in a case where the first optical function layer 34A is provided on the first principal surface 332 of the light guide plate 33 as in the lighting device 30B of the construction according to the above-described second embodiment, the low refractive index layer 61 may be provided on at least part of the first optical function layer 34A or 34B or the second optical function layer 34C or 34D provided on at least one of the first principal surface 332 or the second principal surface 333.

The embodiments have been described above. Note however that the above-described embodiments are presented merely as examples, and the present disclosure is not limited to the above-described embodiments. The above-described embodiments can be carried out in various other forms, and various combinations, omissions, substitutions, and changes can be performed without departing from the spirit of the invention. These embodiments and their modifications are included in the spirit and the scope of the invention as well as the scope of the invention and their equivalents described in the appended claims.

The present application is based on and claims priority to Japanese Patent Application No. 2020-127350, filed on Jul. 28, 2020, the entire contents of the Japanese Patent Application No. 2020-127350 are hereby incorporated herein by reference.

DESCRIPTION OF THE REFERENCE NUMERALS 1 construction
10 framework
11 first framework members
12 second framework members
20 panel
30A, 30B, 30C, 30D, 30E, 30F, 30G, 30H lighting device
31 light sources
32A, 32B, 32C, 32D, 32E, 32F, 32G light guide
33 light guide plate
331 light incident surface
332 first principal surface
333 second principal surface
34A, 34B first optical function layer
34C, 34D second optical function layer
50A, 50B, 50C, 50D, 50E, 50F, 50G light extractor
51 gap portion
511 gaps
52 light scattering particles
53A, 53B prisms
54A, 54B recesses and protrusions
61 low refractive index layer

The invention claimed is:

1. A construction comprising:
a framework comprising a plurality of first framework members provided at predetermined intervals and a plurality of second framework members configured to couple the first framework members that are next to each other; and
a plurality of panels held by the framework,
wherein one or more of the panels are configured to be capable of transmitting visible light,
wherein one or more of the panels configured to be capable of transmitting visible light each are a lighting device,
wherein the lighting device includes
a light source, and
a light guide configured to be capable of transmitting the visible light and includes a light guide plate configured to guide light emitted from the light source, and
wherein the light guide plate includes
a light incident surface facing the light source and into which the light emitted from the light source enters,
a first principal surface provided on an interior of the construction and from which the light guided in the light guide plate exits, and
a second principal surface provided on an exterior of the construction and opposing the first principal surface,
wherein the light guide includes a light extractor configured to allow the light guided in the light guide plate to exit from the first principal surface,
wherein the first principal surface and the second principal surface at both the upper and lower ends of the light guide are respectively held by a pair of holding members provided on the inner surfaces of the corresponding first framework members, and
wherein the light guide plate is sandwiched near the ends of its upper and lower surfaces by the second framework members through each pair of the holding members.

2. The construction according to claim 1, wherein the light extractor includes, in the light guide plate, a gap portion including either a plurality of gaps configured to totally reflect the light propagated through the light guide plate and to allow the light to exit from the first principal surface or a plurality of light scattering particles configured to scatter the light propagated through the light guide plate and to allow the light to exit from the first principal surface.

3. The construction according to claim 1, wherein the light guide includes a first optical function layer provided on a first-principal-surface side of the light guide plate and configured to allow the light that entered from the first principal surface to exit from an exit surface positioned on an opposite side of the first principal surface, and
wherein the light extractor includes either a plurality of gaps or a light scattering particle in the first optical functional layer.

4. The construction according to claim 1, wherein the light guide includes a first optical function layer provided on a first-principal-surface side of the light guide plate and configured to allow the light that entered from the first principal surface to exit from an exit surface positioned on an opposite side of the first principal surface, and
the light extractor includes a prism on the exit surface of the first optical function layer.

5. The construction according to claim 1, wherein the light extractor includes recesses and protrusions comprising a three-dimensional pattern formed on the first principal surface or the second principal surface.

6. The construction according to claim 1, wherein the light guide includes a second optical function layer provided on a second-principal-surface side of the light guide plate and configured to allow the light that entered from the second principal surface to exit in a direction of the first principal surface of the light guide plate, and wherein the light extractor includes either a gap portion including a plurality of gaps or a light scattering particle in the second optical function layer.

7. The construction according to claim 1, wherein the light guide includes a second optical function layer provided on a second-principal-surface side of the light guide plate and configured to allow the light that entered from the second principal surface to exit in a direction of the first principal surface of the light guide plate, and wherein the light extractor includes a prism on a surface positioned on an opposite side to the second principal surface.

8. The construction according to claim 1, wherein the light guide includes, on at least one of a first-principal-surface side or a second-principal-surface side of the light guide plate, a low refractive index layer configured to have a low refractive index with respect to the light guide plate.

9. The construction according to claim 1, wherein the construction is a greenhouse.

\* \* \* \* \*